US011260911B2

(12) United States Patent
Stronach

(10) Patent No.: US 11,260,911 B2
(45) Date of Patent: Mar. 1, 2022

(54) PERSONAL ELECTRIC VEHICLE

(71) Applicant: Elvy Inc., Newmarket (CA)

(72) Inventor: Frank Stronach, Aurora (CA)

(73) Assignee: ELVY INC., Newmarket (CA)

( * ) Notice: Subject to any disclaimer, the term of this patent is extended or adjusted under 35 U.S.C. 154(b) by 0 days.

(21) Appl. No.: 17/362,223

(22) Filed: Jun. 29, 2021

(65) Prior Publication Data
US 2021/0403091 A1 Dec. 30, 2021

Related U.S. Application Data

(60) Provisional application No. 63/170,102, filed on Apr. 2, 2021, provisional application No. 63/046,111, filed on Jun. 30, 2020.

(51) Int. Cl.
| | | |
|---|---|---|
| *B60J 7/00* | (2006.01) | |
| *B62D 21/15* | (2006.01) | |
| *B62D 65/02* | (2006.01) | |
| *B62D 29/00* | (2006.01) | |
| *B62D 23/00* | (2006.01) | |

(52) U.S. Cl.
CPC ........... *B62D 21/15* (2013.01); *B62D 23/005* (2013.01); *B62D 29/008* (2013.01); *B62D 65/024* (2013.01)

(58) Field of Classification Search
CPC ......... G02F 1/133308; G02F 1/133317; G02F 1/13332; B60K 1/04; B62D 25/20; B60N 2/0705; B60N 2/0818; B60N 2/0875; B60N 2/0715
See application file for complete search history.

(56) References Cited

U.S. PATENT DOCUMENTS

| | | | | |
|---|---|---|---|---|
| 2,779,092 A | * | 1/1957 | Gordon | B23K 37/047 29/430 |
| D188,718 S | * | 8/1960 | Laher | D12/85 |
| 3,554,311 A | * | 1/1971 | Thompson | B60K 1/04 180/220 |
| 4,027,739 A | * | 6/1977 | Allenthorp | B60P 3/32 180/89.1 |
| 5,327,989 A | * | 7/1994 | Furuhashi | B60G 3/20 180/248 |
| 5,806,622 A | * | 9/1998 | Murphy | B60K 26/02 180/210 |

(Continued)

OTHER PUBLICATIONS

International Search Report and Written Opinion for Application No. PCT/CA2021/050893 dated Aug. 9, 2021 (10 pages).

(Continued)

*Primary Examiner* — Kiran B Patel
(74) *Attorney, Agent, or Firm* — Michael Best & Friedrich LLP

(57) ABSTRACT

A frame for a personal electric vehicle includes (a) a chassis floorpan extending axially between a front and a rear and laterally between opposite sides, the floorpan having a floor and a sidewall extending upwardly from a periphery of the floor to a raised peripheral edge of the floorpan; and (b) a safety cage mounted to the chassis floorpan and comprising a plurality of interconnected tubular members defining an occupant interior. The tubular members include a plurality of pillars spaced apart from each other along the peripheral edge and fixed against the sidewall for securing the safety cage to the chassis floorpan.

20 Claims, 17 Drawing Sheets

(56) References Cited

U.S. PATENT DOCUMENTS

| | | | |
|---|---|---|---|
| D407,348 S | 3/1999 | Riley | |
| 5,918,692 A * | 7/1999 | Sekita | B60K 1/04 |
| | | | 180/56 |
| 5,947,222 A * | 9/1999 | Yamaoka | B62D 61/06 |
| | | | 180/210 |
| D422,940 S | 4/2000 | Hanagan et al. | |
| D424,979 S | 5/2000 | Hanagan et al. | |
| D469,386 S | 1/2003 | Hanagan et al. | |
| D484,439 S | 12/2003 | Hanagan et al. | |
| D584,188 S | 1/2009 | Jenkins et al. | |
| D695,644 S | 12/2013 | Timonen | |
| 8,678,123 B2 | 3/2014 | Tako et al. | |
| 8,899,364 B1 * | 12/2014 | Al Qanaei | B62D 21/183 |
| | | | 180/89.1 |
| 9,004,220 B2 * | 4/2015 | Kawaguchi | B60G 3/20 |
| | | | 180/443 |
| 9,272,744 B1 * | 3/2016 | de Haan | B62D 31/003 |
| D763,765 S | 8/2016 | Tu et al. | |
| 9,701,346 B2 * | 7/2017 | Deckard | B60N 2/38 |
| 9,895,946 B2 * | 2/2018 | Schlangen | B62D 7/16 |
| D824,805 S | 8/2018 | Karka | |
| 10,053,153 B2 * | 8/2018 | Kobayashi | B60R 21/13 |
| 10,160,301 B2 | 12/2018 | Perlo et al. | |
| 10,167,023 B2 * | 1/2019 | Schneider | B62D 25/2036 |
| 10,266,199 B2 * | 4/2019 | Gong | B60K 1/04 |
| 10,427,578 B2 * | 10/2019 | Deckard | F16D 55/226 |
| 10,532,772 B2 * | 1/2020 | Upah | B62D 23/005 |
| D875,603 S | 2/2020 | Grand | |
| 10,549,632 B1 * | 2/2020 | Dunne, Jr | B60K 5/02 |
| 10,661,680 B2 * | 5/2020 | Milton | B60L 8/003 |
| 11,066,105 B2 * | 7/2021 | Lutz | B60J 5/0487 |
| 2004/0129489 A1 * | 7/2004 | Brasseal | B62D 1/183 |
| | | | 180/350 |
| 2009/0243343 A1 * | 10/2009 | Tamakoshi | B62D 25/2036 |
| | | | 296/204 |
| 2009/0255747 A1 * | 10/2009 | Kasaba | B62D 51/02 |
| | | | 180/208 |
| 2013/0214558 A1 * | 8/2013 | Lohmann | B62D 25/025 |
| | | | 296/187.08 |
| 2014/0019006 A1 | 1/2014 | Bruce | |
| 2017/0197664 A1 * | 7/2017 | Yoshida | B62D 25/04 |
| 2017/0324128 A1 * | 11/2017 | Milton | H01M 10/6555 |
| 2018/0261899 A1 * | 9/2018 | Milton | H01M 10/6567 |
| 2021/0031837 A1 * | 2/2021 | Schmidt | B62D 63/025 |

OTHER PUBLICATIONS

Motor1, "10 Cars that Only Had Three Wheels", 2018, <https://www.motor1.com/features/249411/three-wheel-cars-slideshow/>, 17 pages.

* cited by examiner

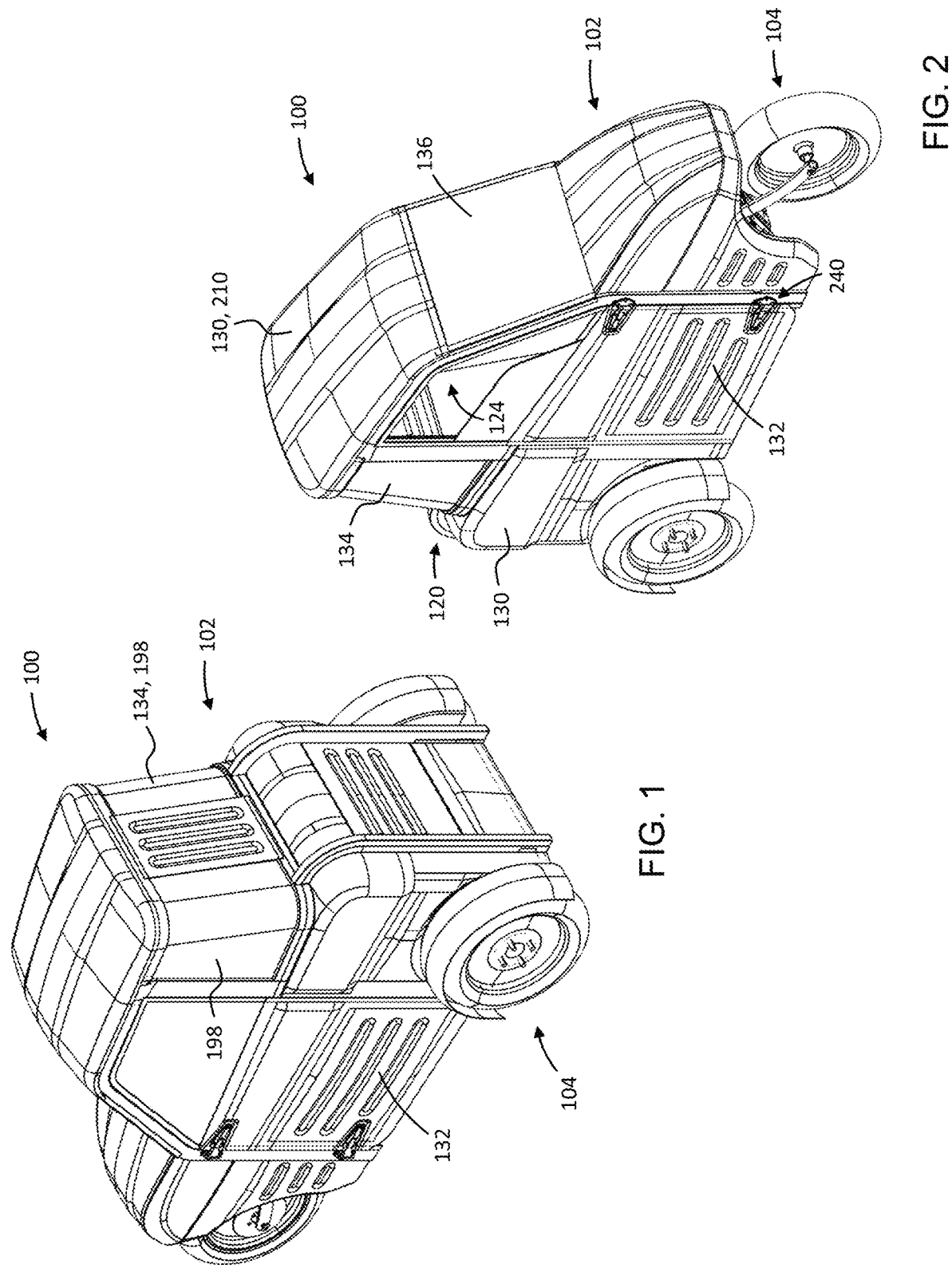

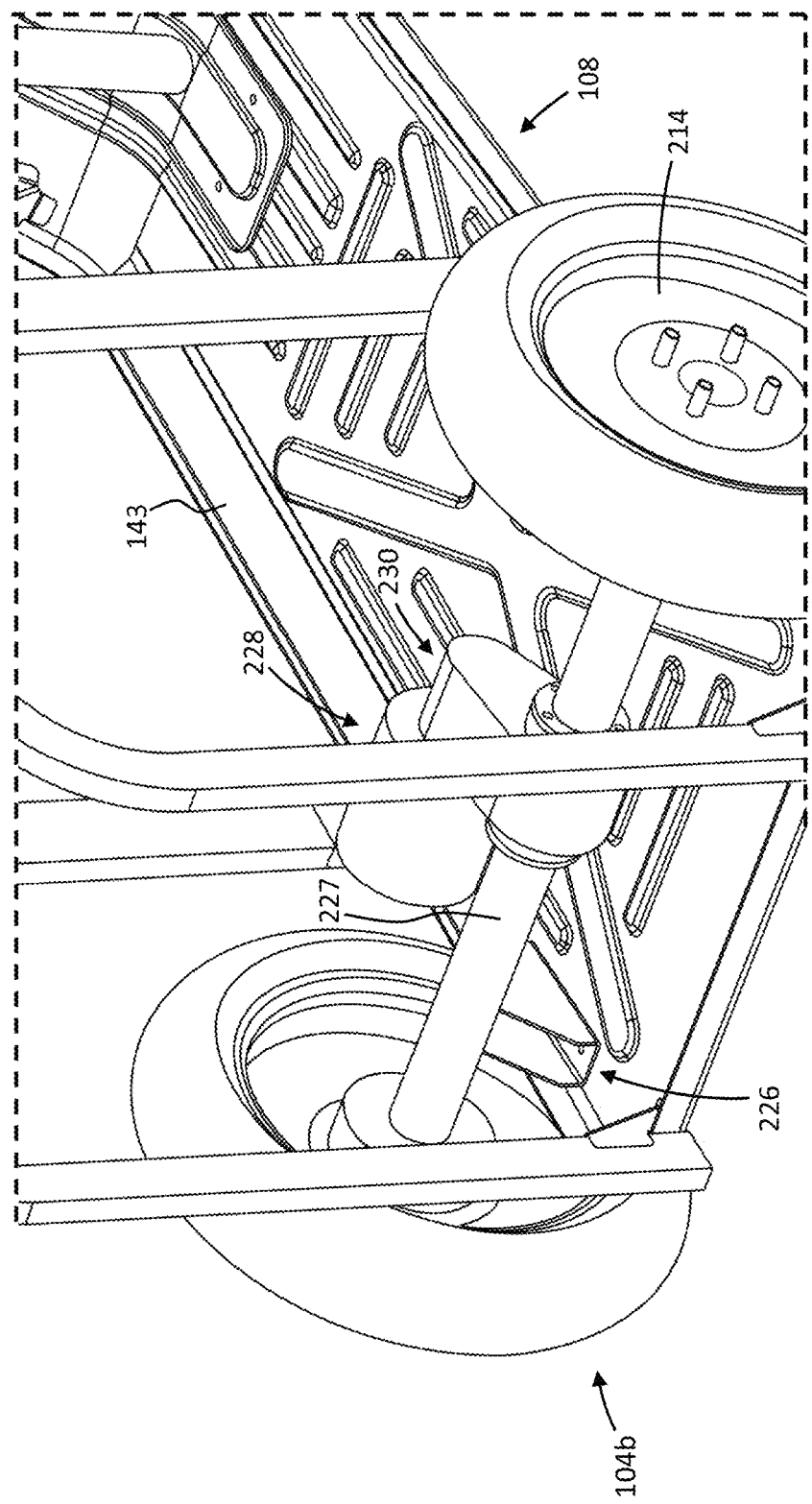

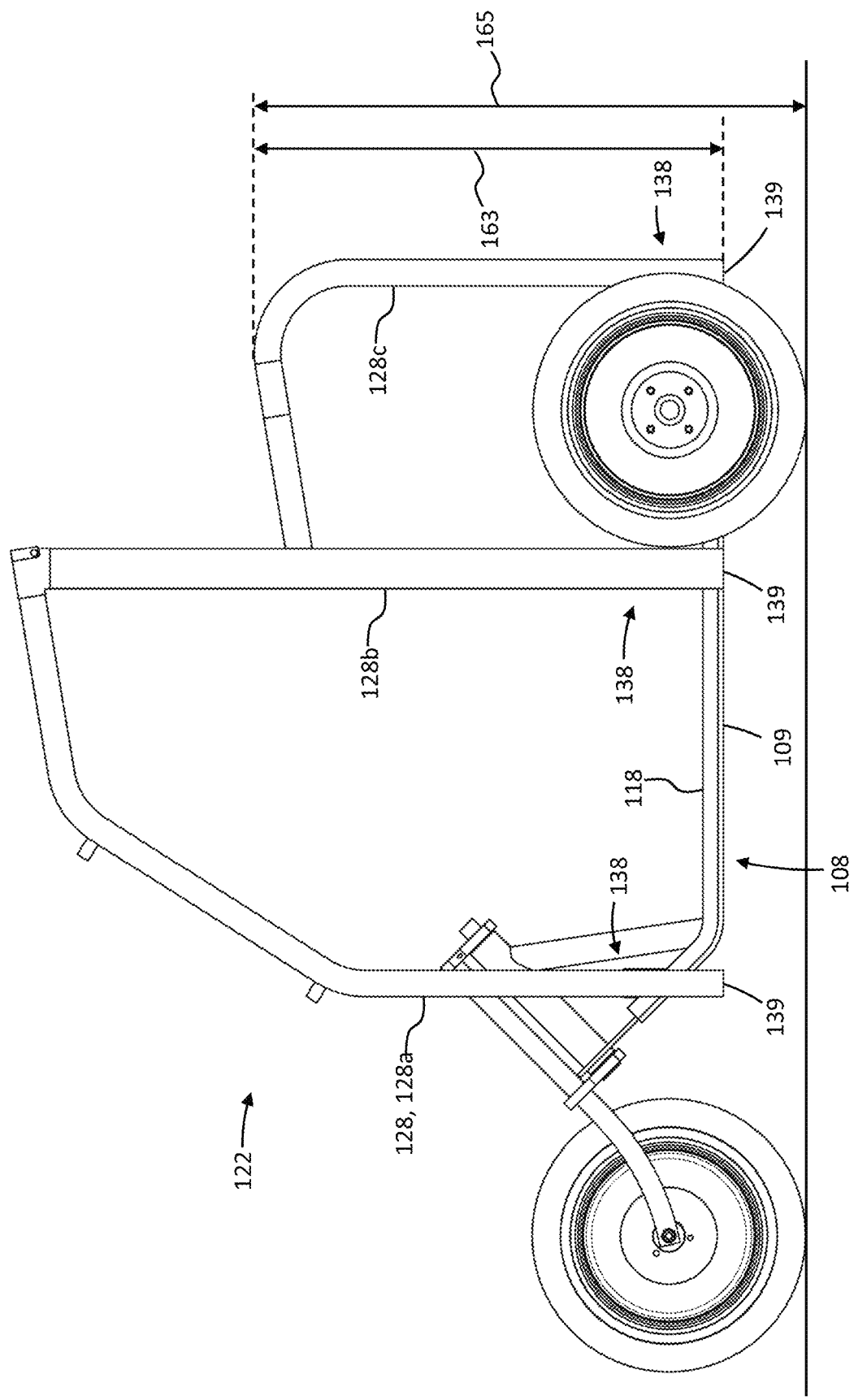

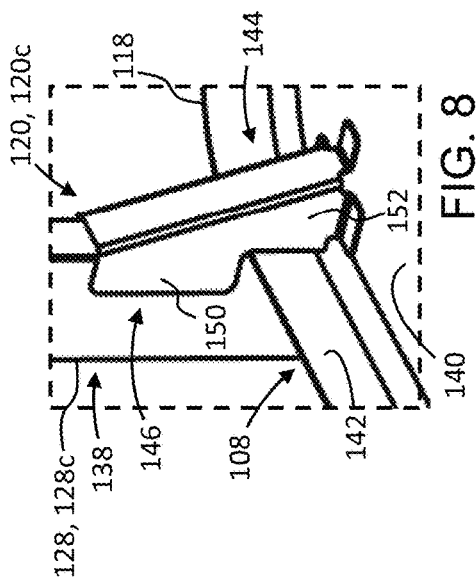
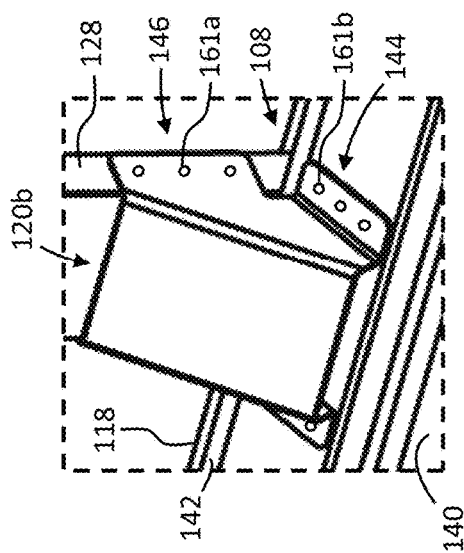
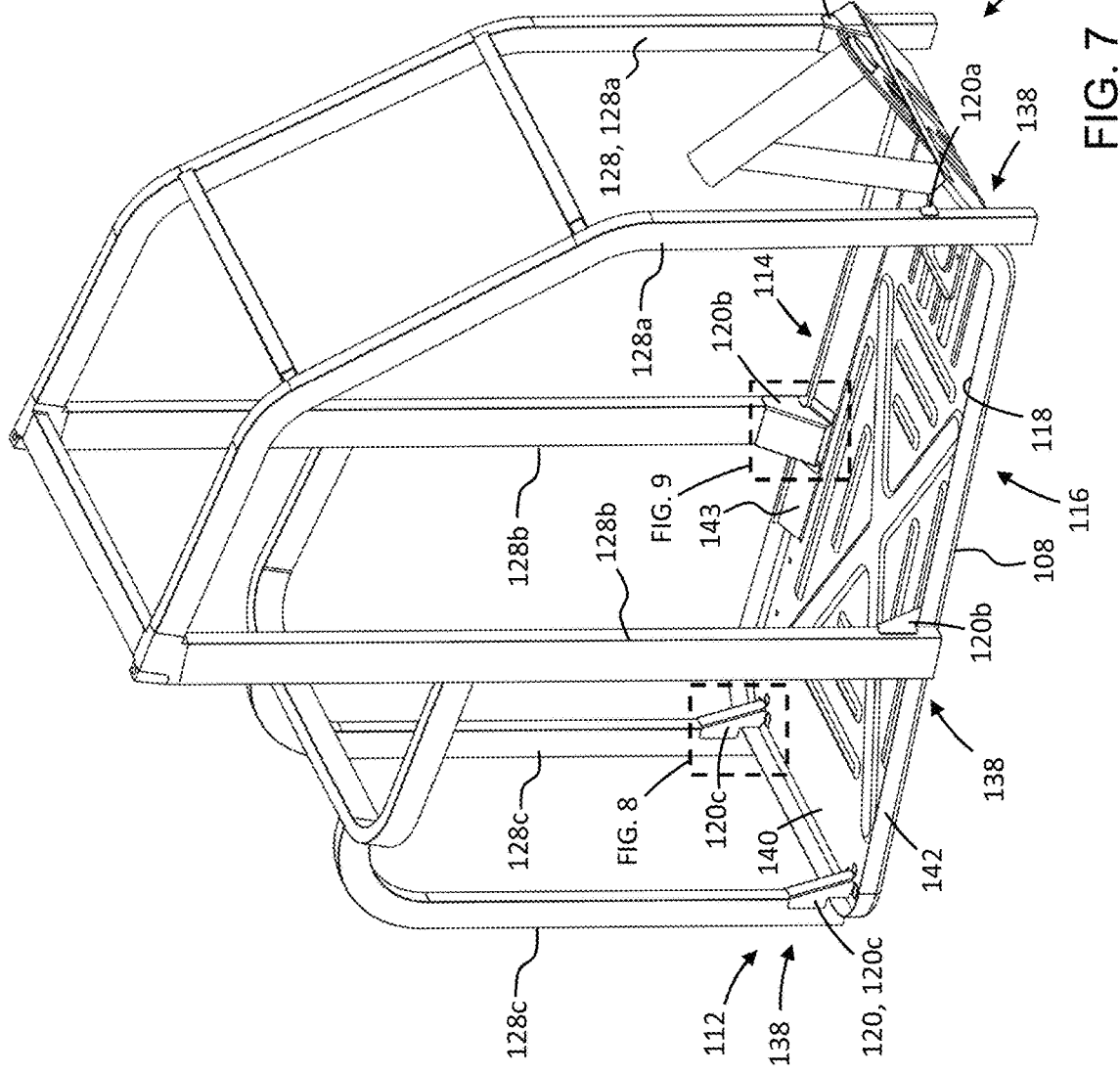

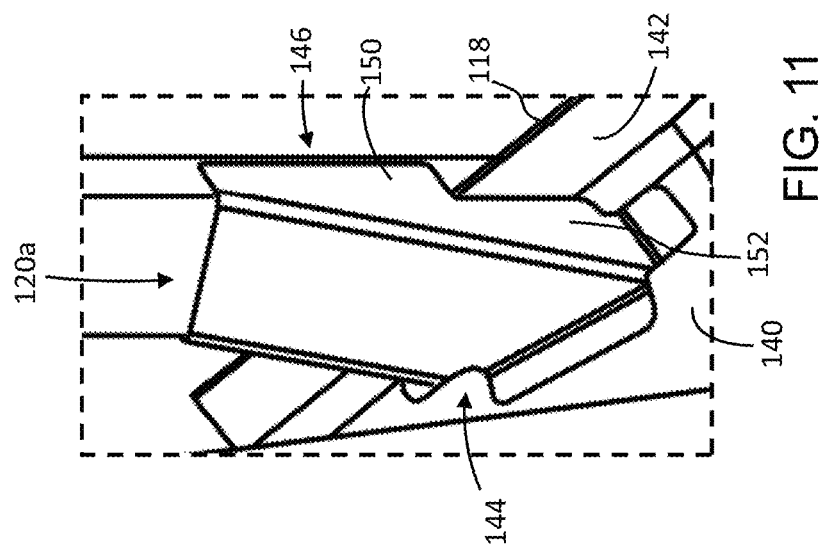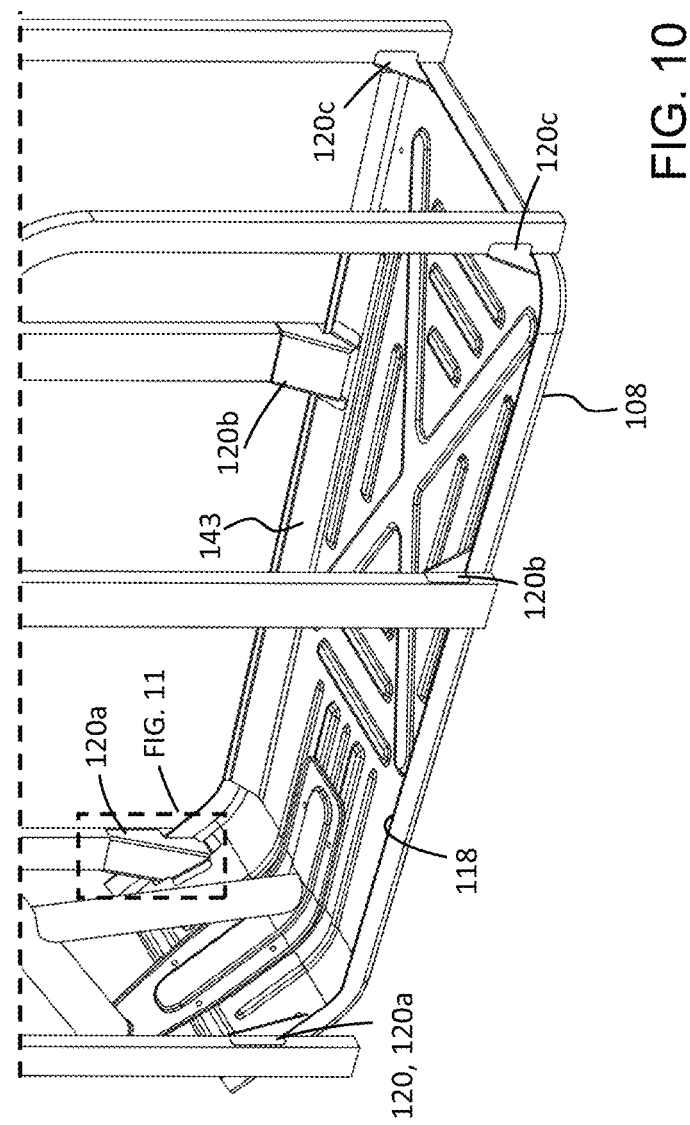

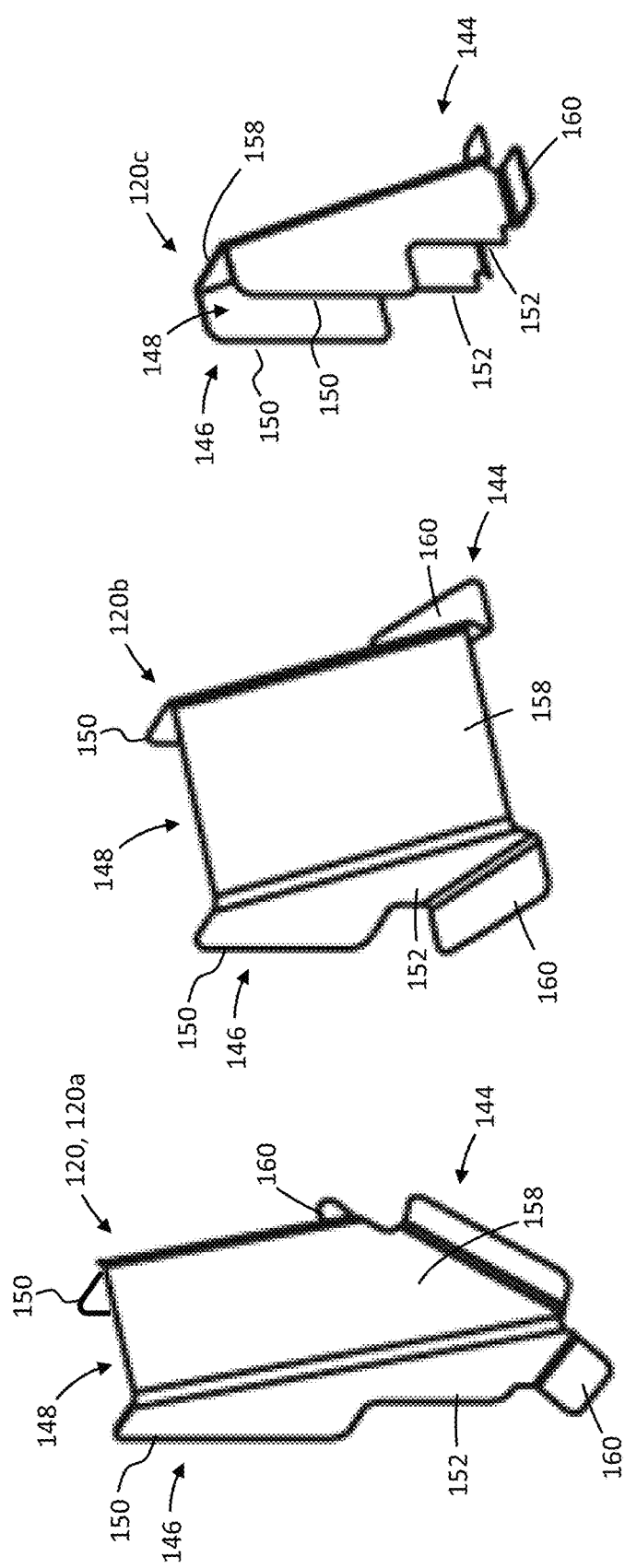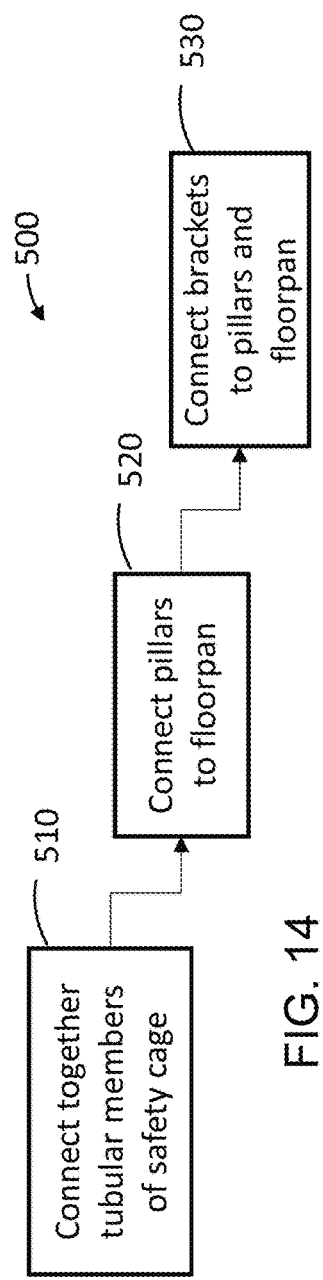

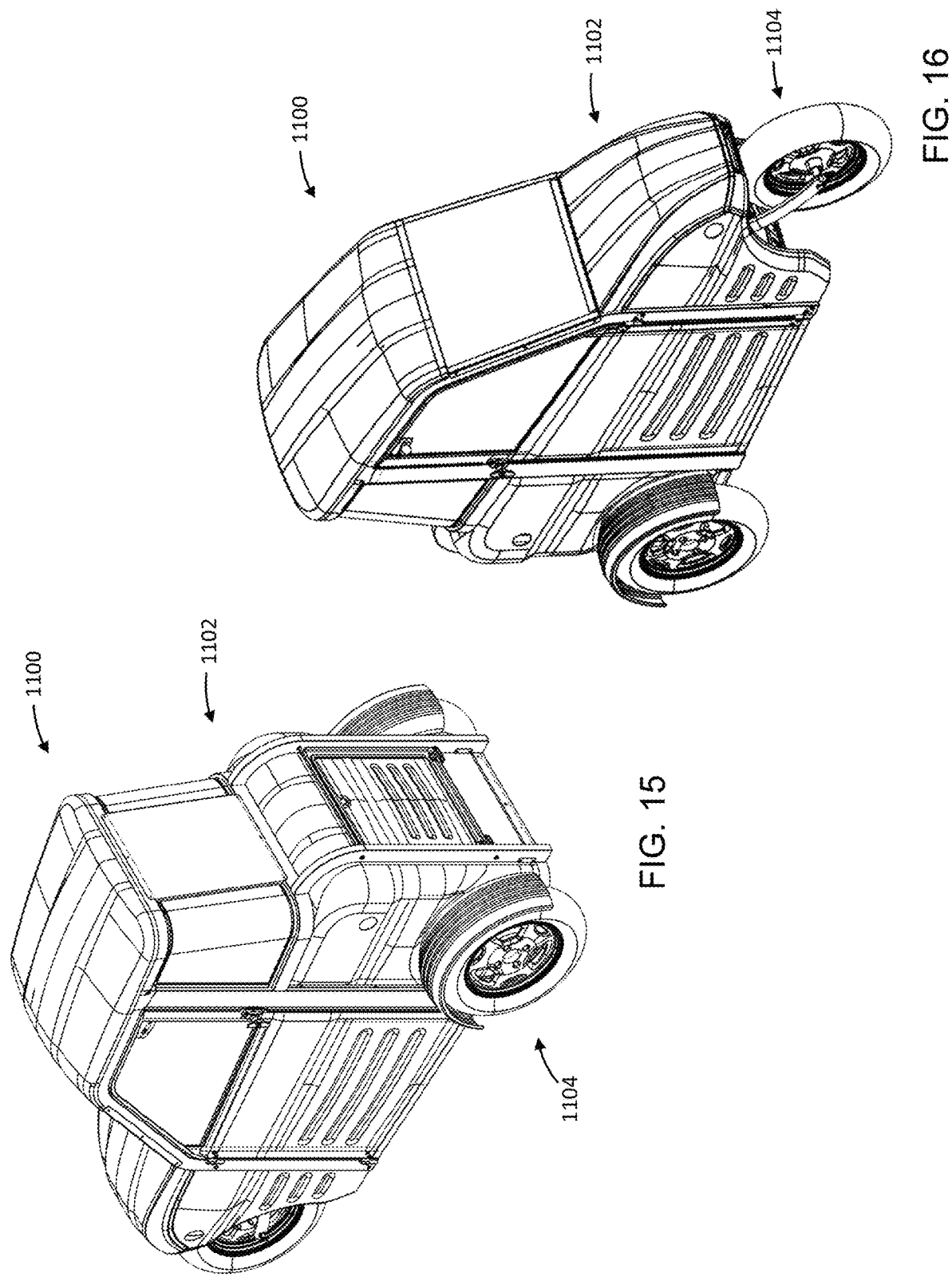

PERSONAL ELECTRIC VEHICLE

CROSS-REFERENCE TO RELATED APPLICATIONS

This application claims the benefit of U.S. Provisional Application No. 63/046,111, filed Jun. 30, 2020, entitled PERSONAL ELECTRIC VEHICLE and U.S. Provisional Application No. 63/170,102, filed Apr. 2, 2021, entitled PERSONAL ELECTRIC VEHICLE, each of which is incorporated herein by reference in its entirety.

FIELD

The specification relates generally to electric vehicles, and more specifically, to frame assemblies for personal electric vehicles.

BACKGROUND

U.S. Pat. No. 5,806,622 (Murphy) discloses an electric vehicle including a chassis supported by three wheels. A seat is carried by the chassis, and the seat is enclosed in a compartment formed by a pivotable canopy. A pair of push-pull steering levers are positioned laterally of the seat to avoid obstructing forward access to the seat. There is an open space through the floor of the vehicle in front of the seat, which allows the occupant to enter and exit from the seat without climbing up into the vehicle. The canopy has a nose portion with a footrest panel that is inclined inwardly toward the occupant in the seat.

U.S. Pat. No. 5,918,692 (Sekita et al.) discloses a vehicle frame made to be compact. A rectangular frame portion includes a vehicle body frame having front wheels supported thereon through leading arms and rear wheels supported thereon through trailing arms. Both front and rear wheels are suspended by front and rear shock absorbers. The heights of pivot points are set almost equal to the heights of the rectangular frame portion. A battery is accommodated in the space defined by the rectangular frame portion and the rear portion of the vehicle body is extended to overhang a swing power unit assembly.

U.S. Pat. No. 10,160,301 (Perlo et al.) discloses an electrically powered motor vehicle including a main frame, a front axle assembly, and a rear axle assembly. The main frame includes a front frame subassembly, a floor-panel subassembly, a rear frame subassembly, and a top frame subassembly. Each of these frame subassemblies includes a lattice structure including steel box-section elements, preferably high-strength steel elements. Each of the frame subassemblies is prearranged for being pre-assembled separately and then subsequently assembled together with the other subassemblies to constitute the main frame.

SUMMARY

The following summary is intended to introduce the reader to various aspects of the applicant's teaching, but not to define any invention.

According to some aspects, a frame for a personal electric vehicle includes: (a) a chassis floorpan extending axially between a front and a rear and laterally between opposite sides, the floorpan having a floor and a sidewall extending upwardly from a periphery of the floor to a raised peripheral edge of the floorpan; and (b) a safety cage mounted to the chassis floorpan and comprising a plurality of interconnected tubular members defining an occupant interior. The tubular members include a plurality of pillars spaced apart from each other along the peripheral edge and fixed against the sidewall for securing the safety cage to the chassis floorpan.

In some examples, the sidewall has an inboard surface directed inwardly toward the floor of the floorpan and an outboard surface opposite the inboard surface and directed away from the floor of the floorpan, and the pillars are fixed against the outboard surface of the sidewall.

In some examples, the pillars are welded to the outboard surface of the sidewall.

In some examples, the sidewall is reinforced by a plurality of integral gussets spaced apart from each other along the peripheral edge. Each gusset is formed integrally with the chassis floorpan at the intersection between the floor and the sidewall. In some examples, each gusset has an inclined surface extending upward and outward from the floorpan to the sidewall.

In some examples, the sidewall extends generally continuously along the opposite sides and rear of the chassis floorpan, and the pillars include at least a first pair of pillars fixed against the sidewall on laterally opposite sides of the chassis floorpan and a second pair of pillars fixed against the sidewall at the rear of the floorpan for protecting the vehicle from rear impact.

In some examples, an entire weight of the safety cage is borne by the chassis floorpan.

In some examples, the chassis floorpan is formed of integral, unitary, one-piece stamped metal construction.

In some examples, the chassis floorpan and the tubular members are formed of aluminum.

In some examples, the pillars include a pair of front pillars adjacent the front and on laterally opposite sides of the chassis floorpan, a pair of rear pillars at the rear of and adjacent laterally opposite sides of the chassis floorpan for protecting the vehicle from rear impact, and a pair of intermediate pillars axially intermediate the front and rear pillars and on laterally opposite sides of the chassis floorpan. In some examples, each rear pillar has a vertical extent of at least 0.75 m.

In some examples, the tubular members include a U-shaped member connecting the rear pillars to the intermediate pillars to facilitate force transfer from the rear pillars to the intermediate pillars during rear impact. In some examples, the U-shaped member has a cross member extending laterally between and connecting upper ends of the pair of rear pillars, and a pair of axial members extending from laterally opposite ends of the cross member to the pair of intermediate pillars. In some examples, the upper ends of the rear pillars and the U-shaped member are at an elevation below upper ends of the intermediate pillars.

In some examples, the chassis floorpan has a generally horizontal floorpan portion and an inclined floorpan portion sloping upwardly from a front of the horizontal floorpan portion to the front of the chassis floorpan, and at least one pair of the pillars are fixed to the inclined floorpan portion on corresponding sides of the floorpan.

In some examples, the frame further includes a reinforcing subplate secured to a portion of the chassis floorpan. In some examples, the subplate has a generally horizontal subplate portion fixed to an upper surface of the horizontal floorpan portion and an inclined subplate portion extending forward from a front end of the horizontal subplate portion. The inclined subplate portion is fixed to an upper surface of the inclined floorpan portion. In some examples, the frame further includes a steering tube projecting generally orthogonally from an upper surface of the inclined subplate portion. The steering tube is for coupling a steerable front wheel to the frame.

In some examples, the frame further includes a support post extending between an upper end of the steering tube and the horizontal subplate portion for supporting the steering tube in fixed position relative to the floorpan.

In some examples, the inclined subplate portion has an extension projecting forward of the chassis floorpan, and a bottom portion of the steering tube is fixed to the extension.

In some examples, the frame further includes a plurality of brackets fixed to and supported by the floorpan adjacent the peripheral edge and spaced apart from each other therealong, and each pillar has a generally vertical lower portion outboard of the peripheral edge of the floorpan and fixed to a corresponding bracket. In some examples, each bracket has a base fixed to the chassis floorpan inboard of the sidewall and an overhang projecting over and outboard of the sidewall. The overhang is fixed to the lower portion of a corresponding pillar. In some examples, the overhang defines a vertical channel outboard of the sidewall for receiving the lower portion of a corresponding pillar.

According to some aspects, a method of assembling a frame for a personal electric vehicle includes: (a) positioning a stamped chassis floorpan inboard of a plurality of pillars of a safety cage defining an interior for an occupant; and (b) after (a), fixing the pillars against an outboard surface of a sidewall of the floorpan for securing the safety cage to the chassis floorpan.

In some examples, during at least one of step (a) and (b), a generally flat bottom end of each pillar rests on a horizontal support surface for supporting the safety cage in a free standing upright position, and the chassis floorpan rests on the support surface inboard of the safety cage with the outboard surface of the sidewall abutting each pillar for locating the chassis floorpan relative to the safety cage during assembly.

In some examples, the method further includes, prior to step (b), mounting a plurality of brackets to the chassis floorpan, and step (b) includes fixing the pillars to the brackets. In some examples, mounting the plurality of brackets includes positioning a base of each bracket atop the chassis floorpan adjacent the sidewall, and with an overhang of each bracket projecting over and outboard of the sidewall for attachment to a corresponding pillar.

BRIEF DESCRIPTION OF THE DRAWINGS

The drawings included herewith are for illustrating various examples of apparatuses, articles, and methods of the present specification and are not intended to limit the scope of what is taught in any way. In the drawings:

FIG. 1 is a rear perspective view of an example personal electric vehicle;

FIG. 2 is a front perspective view of the vehicle of FIG. 1;

FIG. 5 is a rear perspective view from a second side of a portion of the frame and wheel assemblies of FIG. 4;

FIG. 6 is a side elevation view of the frame and wheel assemblies of FIG. 4, with a head compartment subassembly of the frame assembly omitted;

FIG. 7 is a front perspective view of the frame assembly of FIG. 6;

FIG. 8 is an enlarged view of a portion of FIG. 7;

FIG. 9 is an enlarged view of another portion of FIG. 7;

FIG. 10 is a rear perspective view of a lower portion of the frame assembly of FIG. 6;

FIG. 11 is an enlarged view of a portion of FIG. 10;

FIG. 13A is a perspective view of a front bracket of the frame assembly of FIG. 6;

FIG. 13B is a perspective view of an intermediate bracket of the frame assembly of FIG. 6;

FIG. 13C is a perspective view of a rear bracket of the frame assembly of FIG. 6;

FIG. 14 is a schematic showing an example process for assembling a frame assembly for a personal electric vehicle like that of FIG. 1;

FIG. 15 is a rear perspective view of another example personal electric vehicle;

FIG. 16 is a front perspective view of the vehicle of FIG. 15;

DETAILED DESCRIPTION

Various apparatuses, articles, or processes will be described below to provide an example of an embodiment of each claimed invention. No embodiment described below limits any claimed invention and any claimed invention may cover apparatuses, articles, or processes that differ from those described below. The claimed inventions are not limited to apparatuses, articles, or processes having all of the features of any one apparatus, article, or process described below or to features common to multiple or all of the apparatuses, articles, or processes described below. It is possible that an apparatus, article, or process described below is not an embodiment of any claimed invention. Any invention disclosed in an apparatus, article, or process described below that is not claimed in this document may be the subject matter of another protective instrument, for example, a continuing patent application, and the applicants, inventors, or owners do not intend to abandon, disclaim, or dedicate to the public any such invention by its disclosure in this document.

According to some aspects of the teachings disclosed herein, a frame assembly for a personal electric vehicle is disclosed. The frame assembly can, according to some aspects, help reduce costs associated with production of the vehicle, and simplify assembly and manufacturing of the frame assembly and electric vehicle. Frame assemblies as disclosed herein can also help provide an electric vehicle that is light-weight yet provides a safe enclosure for a vehicle occupant in the event of a crash or accident. Furthermore, frame assemblies as described herein can help provide an electric vehicle that is compact in size yet large enough to comfortably accommodate an adult with luggage such as a briefcase, purse, groceries, etc.

Figure 4:
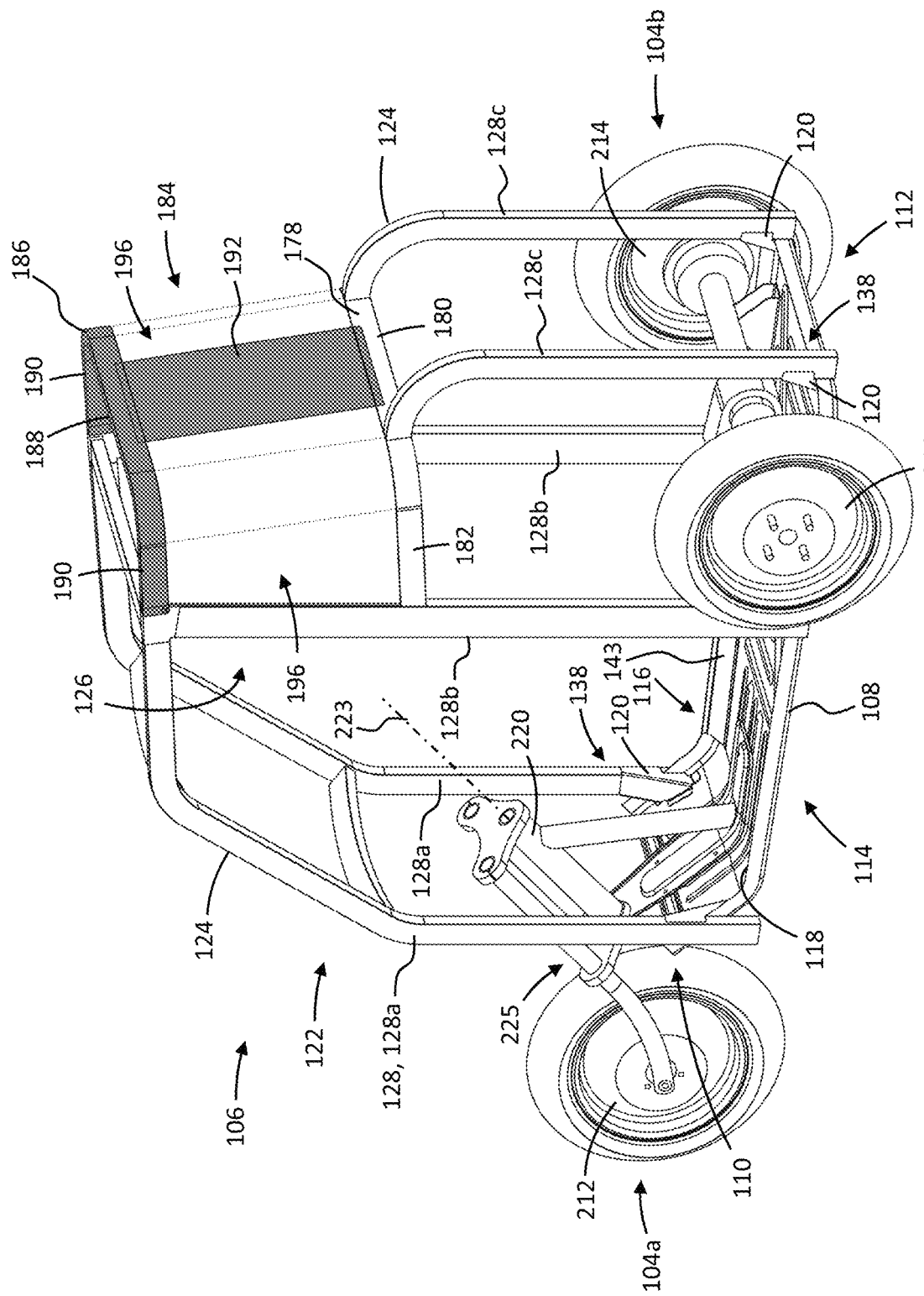
FIG. 4 is a rear perspective view from a first side of frame and wheel assemblies of the vehicle of FIG. 1.

Referring to FIGS. 1 and 2, an example personal electric vehicle 100 is illustrated. The vehicle 100 has a vehicle body 102 and a plurality of wheel assemblies 104 for supporting the vehicle body 102 above a ground surface. The vehicle 100 is, in the example illustrated, generally sized to accommodate a single occupant. In some examples, the vehicle has a seat for the occupant (the driver) with a backrest that can be adjusted forward/rearward of the seat base, and if moved to its rearward position, a second occupant can be accommodated on the seat, immediately behind the driver (similar to seating on a motorcycle). Referring to FIG. 4, in the example illustrated, the vehicle body includes a frame 106. The frame 106 can provide a number of advantages, including reduced costs of materials and manufacturing of the frame 106 and vehicle 100.

In the example illustrated, the frame 106 includes a chassis floorpan 108 extending axially between a front 110 and a rear 112 and laterally between opposite sides 114, 116. The chassis floorpan 108 has a peripheral edge 118 extending thereabout. The chassis floorpan 108 is, in the example illustrated, formed of integral, one-piece stamped metal construction. In the example illustrated, the chassis floorpan 108 serves as a structural member of the frame that, together with the tubular members 124 provides a frame that is able to withstand forces exerted on the frame during operation of the vehicle.

In the example illustrated, a plurality of optional brackets 120 are fixed to and supported by the chassis floorpan 108 adjacent the peripheral edge 118, with the brackets 120 spaced apart from each other along the peripheral edge 118. A safety cage 122 is mounted to the chassis floorpan 108. The safety cage 122 includes a plurality of interconnected tubular members 124 defining an interior 126 for an occupant. The tubular members 124 include a plurality of pillars 128, with lower portions of the pillars 128 engageable with the brackets 120 to help secure the safety cage 122 to the chassis floorpan 108. In the example illustrated, an entire weight of the safety cage 122 (including, where provided, the brackets 120) is borne by the chassis floorpan 108.

Referring to FIG. 2, in the example illustrated, a plurality of body panels 130, at least one door 132, and a plurality of windows 134 including a windshield 136 are mounted to the safety cage 122 for generally enclosing the interior 126, which is sized for a single occupant in the example illustrated. In the example illustrated, an entire weight of the body panels 130, at least one door 132, and windows 134 is borne by the chassis floorpan 108 (FIG. 4).

Referring to FIG. 4, in the example illustrated, each pillar 128 of the safety cage 122 has a generally vertical lower portion 138 fixed to a corresponding bracket 120. Referring to FIG. 6, in the example illustrated, the lower portion 138 of each pillar 128 extends down to a generally flat bottom end 139, and the bottom ends 139 of the pillars 128 lie in a common plane (and are at a common elevation in the example shown) with each other and an underside surface 109 of the chassis floorpan 108. This can allow the safety cage 122 to be free standing and facilitate assembly with the chassis floorpan 108 as described below.

Referring to FIG. 7, in the example illustrated, the lower portion 138 of each pillar 128 is outboard of the peripheral edge 118 of the chassis floorpan 108. In the example illustrated, the chassis floorpan 108 has a floor 140 and a sidewall 142 extending upwardly from a periphery of the floor 140 to the peripheral edge 118. Each bracket 120 is mounted overtop the floor 140 adjacent the sidewall 142. In the example illustrated, the sidewall 142 extends continuously along the sides 114, 116 and rear 112 of the chassis floorpan 108 and provides a raised peripheral edge 118 therealong. This can help increase stiffness of the chassis floorpan 108 and help support the brackets 120 and/or pillars 128.

Referring to FIG. 8, in the example illustrated, each bracket 120 has a base 144 fixed to the chassis floorpan 108 inboard of the sidewall 142 and an overhang 146 projecting over and outboard of the sidewall 142. The overhang 146 of each bracket is fixed to the lower portion 138 of a corresponding pillar 128. In the example illustrated, the lower portion 138 of each pillar 128 abuts and is fixed against an outboard surface of the sidewall 142 (e.g. indirectly via the brackets 120 and/or directly through other fasteners, adhesives, welds, etc.).

In the example illustrated, the overhang 146 defines a vertical channel 148 (FIG. 13C) outboard of the sidewall 142 for receiving the lower portion 138 of a corresponding pillar 128. In the example illustrated, the overhang 146 includes a pair of parallel and vertical overhang panels 150 projecting outboard of the chassis floorpan 108 from above and perpendicular to the sidewall 142 (see also FIG. 13C). The overhang panels 150 provide the vertical channel 148 (FIG. 13C) therebetween and are fixed to a corresponding pillar 128.

Referring to FIGS. 13A-13C, in the example illustrated, the base 144 of each bracket 120 includes a pair of parallel and vertical base panels 152. Each base panel 152 is generally positionable adjacent the sidewall 142, and extends vertically between the floor 140 and a corresponding overhang panel 150. Each bracket 120 further includes a center panel 158 extending horizontally perpendicular to and joining together the opposed base panels 152 and the opposed overhang panels, and extending vertically between a bottom edge adjacent the floor 140 and a top edge adjacent a corresponding pillar 128. The base 144 of each bracket 120 further includes at least one flange 160 projecting outwardly from a lower edge of the base panel 152 (and of the center panel 158 for the brackets 120a, 120c). Each flange 160 is anchored to the chassis floorpan 108 for fixing the bracket 120 to the floorpan 108.

Referring to FIG. 9, in the example illustrated, the pillars 128 are fixed to the brackets 120 through adhesive and fasteners 161a (shown schematically in FIG. 9), and the brackets 120 are fixed to the chassis floorpan 108 through adhesive and fasteners 161b (shown schematically in FIG. 9). In some examples, this can facilitate simplified assembly of the frame 106. The fasteners 161a, 161b can comprise, for example, rivets. In the example illustrated, the frame 106 is free of structural weldments between the pillars 128 and the brackets 120, and between the brackets 120 and the chassis floorpan 108.

In the example illustrated, each of the chassis floorpan 108 and the tubular members 124 are formed of aluminum. The chassis floorpan 108 comprises an aluminum sheet metal stamping, and the tubular members 124 comprise aluminum tubing. In the example illustrated, the tubular members 124 have a rectangular cross-section.

Referring to FIG. 7, in the example illustrated, the pillars 128 comprise a pair of front pillars 128a adjacent the front 110 and on laterally opposite sides 114, 116 of the chassis floorpan 108, a pair of rear pillars 128c at the rear 112 and adjacent laterally opposite sides 114, 116 of the chassis floorpan 108, and a pair of intermediate pillars 128b axially intermediate the front and rear pillars 128*a*, 128*c* and on laterally opposite sides 114, 116 of the chassis floorpan 108. The intermediate pillars 128*b* are, in the example illustrated, tubular members approximately 25 mm×75 mm in cross-section, while the remaining tubular members are approximately 25 mm×50 mm in cross-section.

In the example illustrated, the pair of rear pillars 128*c* are mounted at the rear 112 of the chassis floorpan 108 laterally intermediate the pair of intermediate pillars 128*b*. Referring to FIG. 6, in the example illustrated, each rear pillar 128*c* has a vertical extent 163 of at least about 0.75 m. This can help protect the rear of the vehicle 100 from impact from vehicle bumpers. In the example illustrated, the vertical extent 163 of each rear pillar 128*c* is about 0.85 m. When the body 102 is supported by the wheel assemblies 104, each rear pillar 128*c* extends to a height 165 of approximately 1.0 m above the ground surface.

Referring to FIG. 7, in the example illustrated, the brackets 120 comprise a pair of front brackets 120*a* fixed to laterally opposite sides 114, 116 adjacent the front 110 of the chassis floorpan 108, a pair of rear brackets 120*c* fixed to the rear 112 adjacent laterally opposite sides 114, 116 of the chassis floorpan 108, and a pair of intermediate brackets 120*b* fixed to laterally opposite sides 114, 116 of the chassis floorpan 108 axially intermediate the front and rear brackets 120*a*, 120*c*. The front, intermediate, and rear pillars 128*a*, 128*b*, 128*c* are, in the example illustrated, secured to the sidewall 142 of the chassis floorpan 108, and further secured to the chassis floorpan 108 by the front, intermediate, and rear brackets 120*a*, 120*b*, 120*c*, respectively. The overhang 146 of the front and intermediate brackets 120*a*, 120*b* projects laterally outboard of the chassis floorpan 108 for engagement with the front and intermediate pillars 128*a*, 128*c*, respectively. The overhang 146 of the rear brackets 120*c* projects rearwardly outboard of the chassis floorpan 108 for engagement with the rear pillars 128*c*.

In the example illustrated, a longitudinally intermediate portion of the sidewall 142 along each of the left and rights sides of the floorpan 108 is reinforced by an edge gusset 143 having a laterally outer edge connected to an inner surface of the sidewall 142 proximate the upper end (i.e. proximate the peripheral edge 118), and a laterally inner edge connected to the floor 140 at a position spaced laterally inboard of the sidewall 142. Each edge gusset 143 extends longitudinally from a gusset front end proximate the inclined floorpan portion 108*b* to a gusset back end disposed rearward of the intermediate pillars 128*b*.

Figure 12:
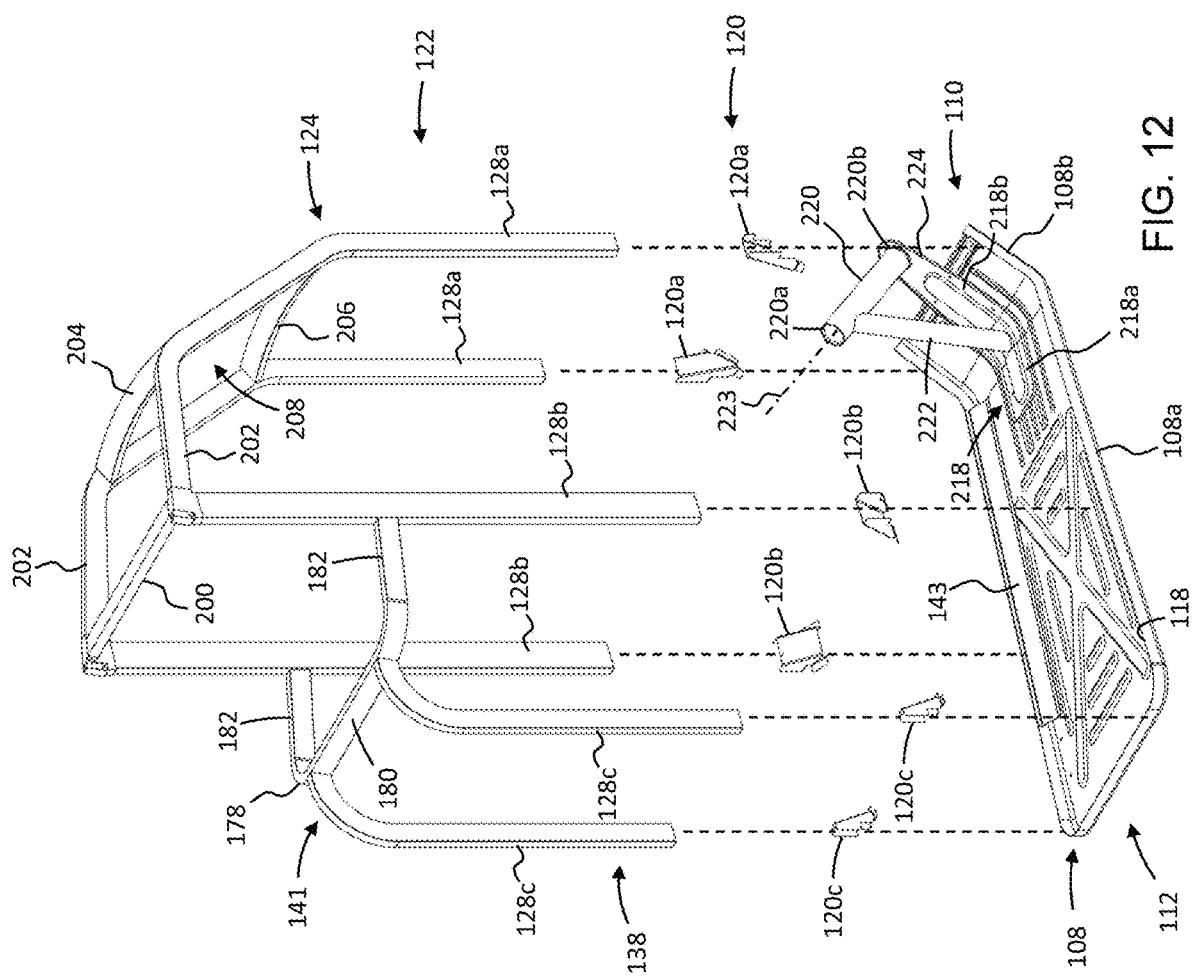
FIG. 12 is an exploded view of the frame assembly of FIG. 6.

Referring to FIG. 12, in the example illustrated, the tubular members 124 include a lower U-shaped member 178 connecting the rear pillars 128*c* to the intermediate pillars 128*b* at an intermediate point along their height. In the example illustrated, the lower U-shaped member 182 is rigidly secured (e.g. by welding in the example illustrated) to the intermediate pillars 128*b* and the rear pillars 128*c*, and can facilitate force transfer from the rear pillars 128*c* to the intermediate pillars 128*b* at a position below the head compartment 184 (e.g. during a rear-end impact). In the example illustrated, the lower U-shaped member 178 has a lower cross portion 180 extending laterally between and connecting upper ends of the pair of rear pillars 128*c*, and a pair of lower axial portions 182 extending axially from laterally opposite ends of the cross portion 180 to the pair of intermediate pillars 128*b*. In the example illustrated, the upper ends of the pair of rear pillars 128*c* and the lower U-shaped member 178 are at an elevation below upper ends of the intermediate pillars 128*b*. In the example illustrated, the axial portions 182 of the U-shaped member 178 are connected to the intermediate pillars at least 0.35 m below the upper ends of the intermediate pillars 128*b*.

In the example illustrated, the lower portion 138 of each rear pillar 128*c* extends generally vertically upwardly from a corresponding rear bracket 120*c*, and each rear pillar 128*c* has a curved upper portion 141 extending upwardly from the lower portion 138 and forwardly to the cross portion 180 of the U-shaped member 178.

Referring to FIG. 4, in the example illustrated, the safety cage 122 includes a head compartment subassembly 184 for protecting a head of the occupant. The head compartment subassembly 184 includes an upper U-shaped member 186 spaced vertically above the lower U-shaped member 178. The upper U-shaped member 186 has an upper cross portion 188 spaced above the lower cross portion 180, and a pair of upper axial portions 190 extending from laterally opposite ends of the upper cross portion 188 to upper ends of the pair of intermediate pillars 128*b*. The head compartment subassembly 184 further includes a laterally centered head rest panel 192 extending vertically between and connecting the lower and upper cross portions 180, 188 for providing a head rest 194 (FIG. 3) behind the occupant's head. The head compartment subassembly 184 defines a pair of rear window openings 196 on laterally opposite sides of the head rest panel 192 for receiving a pair of rear window panels 198 (FIG. 1) of the plurality of windows 134. Each rear window opening 196 extends vertically between the lower and upper U-shaped members 178, 186 and horizontally between the head rest panel 192 and a corresponding intermediate pillar 128*b*.

Referring to FIG. 12, in the example illustrated, the tubular members 124 of the safety cage 122 further include an intermediate cross member 200 extending laterally between and connecting upper ends of the pair of intermediate pillars 128*b*. The tubular members 124 further include a pair of axial members 202 extending axially between and connecting upper ends of the pair of front pillars 128*a* with upper ends of the pair of intermediate pillars 128*b*. In the example illustrated, each axial member 202 is formed integrally with a corresponding front pillar 128*a*. In the example illustrated, the tubular members 124 further include a front upper cross member 204 extending laterally between and connecting upper ends of the pair of front pillars 128*a*, and a front lower cross member 206 extending laterally between and connecting the pair of front pillars 128*a* at an elevation below the upper cross member 204. The upper and lower cross members 204, 206 define a windshield opening 208 vertically therebetween for receiving the windshield 136 (FIG. 2) of the vehicle 100. In the example illustrated, the upper U-shaped member 186 (FIG. 4), axial members 202, and front upper cross member 204 define a roof support structure for supporting a roof panel 210 (FIG. 2) of the plurality of body panels 130.

Referring to FIG. 12, in the example illustrated, the chassis floorpan 108 has a generally horizontal floorpan portion 108*a* extending from the rear 112 toward the front 110, and an inclined floorpan portion 108*b* sloping upwardly from a front of the horizontal floorpan portion 108*a* to the front 110 of the chassis floorpan 108. The inclined floorpan portion 108*b* can serve as a footrest for the occupant. In the example illustrated, the front brackets 120*a* are fixed to the inclined floorpan portion 108*b*. The intermediate brackets 120*b* are fixed to the edge gussets 143 of the floorpan 108, and the rear brackets 120*c* are fixed to the horizontal floorpan portion 108*a*.

Referring to FIG. 4, in the example illustrated, the wheel assemblies 104 include a front wheel assembly 104*a* mounted toward the front 110 of the chassis floorpan 108 and a rear wheel assembly 104b mounted toward the rear 112 of the chassis floorpan 108. In the example illustrated, the vehicle 100 is three-wheeled, with the front wheel assembly 104a having a single, laterally centered front wheel 212 and the rear wheel assembly 104b having a pair of rear wheels 214 on laterally opposite sides 114, 116 of the chassis floorpan 108. In the example illustrated, the front wheel assembly 104a is mounted to the frame 106 laterally intermediate the front pillars 128a, and the rear wheel assembly 104b is mounted to the frame 106 axially intermediate the rear and intermediate pillars 128c, 128b.

Referring to FIG. 12, in the example illustrated, the frame 106 includes a front wheel assembly mount having a subplate 218 fixed atop the chassis floorpan 108. The subplate 218 has a generally horizontal subplate portion 218a atop the horizontal floorpan portion 108a and an inclined subplate portion 218b extending from a front of the horizontal subplate portion 218a atop and parallel with the inclined floorpan portion 108b. The front wheel assembly mount includes a steering tube 220 projecting orthogonally from an upper surface of the inclined subplate portion 218b along a steering axis 223 to an open top end 220a for receiving a steering shaft. In the example illustrated, the front wheel assembly mount further includes a support post 222 extending from the horizontal subplate portion 218a to the steering tube 220 for supporting the steering tube 220 above the horizontal subplate portion 218a. In the example illustrated, the inclined subplate portion 218b has an extension 224 projecting forward and upward of the chassis floorpan 108, and a bottom end 220b of the steering tube 220 (opposite the open top end 220a) is fixed to the extension 224.

Referring to FIG. 4, in the example illustrated, the front wheel assembly 104a includes a steering fork assembly 225 holding the front wheel 212 in front of the frame 106. The steering fork assembly 225 is coupled to the steering shaft (received in the steering tube 220) and is pivotable about the steering axis 223 to turn the front wheel 212.

Referring to FIG. 5, in the example illustrated, the rear wheel assembly 104b is secured to the chassis floorpan 108 through a plurality of rear wheel assembly brackets 226 fixed atop the chassis floorpan 108. The rear wheel assembly brackets 226 include a base bolted to the chassis floorpan 108 and a pair of webs extending upright from the base. Upper ends of the webs are, in the example illustrated, welded to a tubular axle housing 227, and a rotary axle for propelling the wheels extends within the housing 227. In the example illustrated, the vehicle 100 includes an electric motor 228 coupled to the rear wheel assembly 104b through a drive train 230 for driving rotation of the rear wheels 214. In the example illustrated, the motor 228 is supported atop and toward the rear of the chassis floorpan 108.

Figure 3:
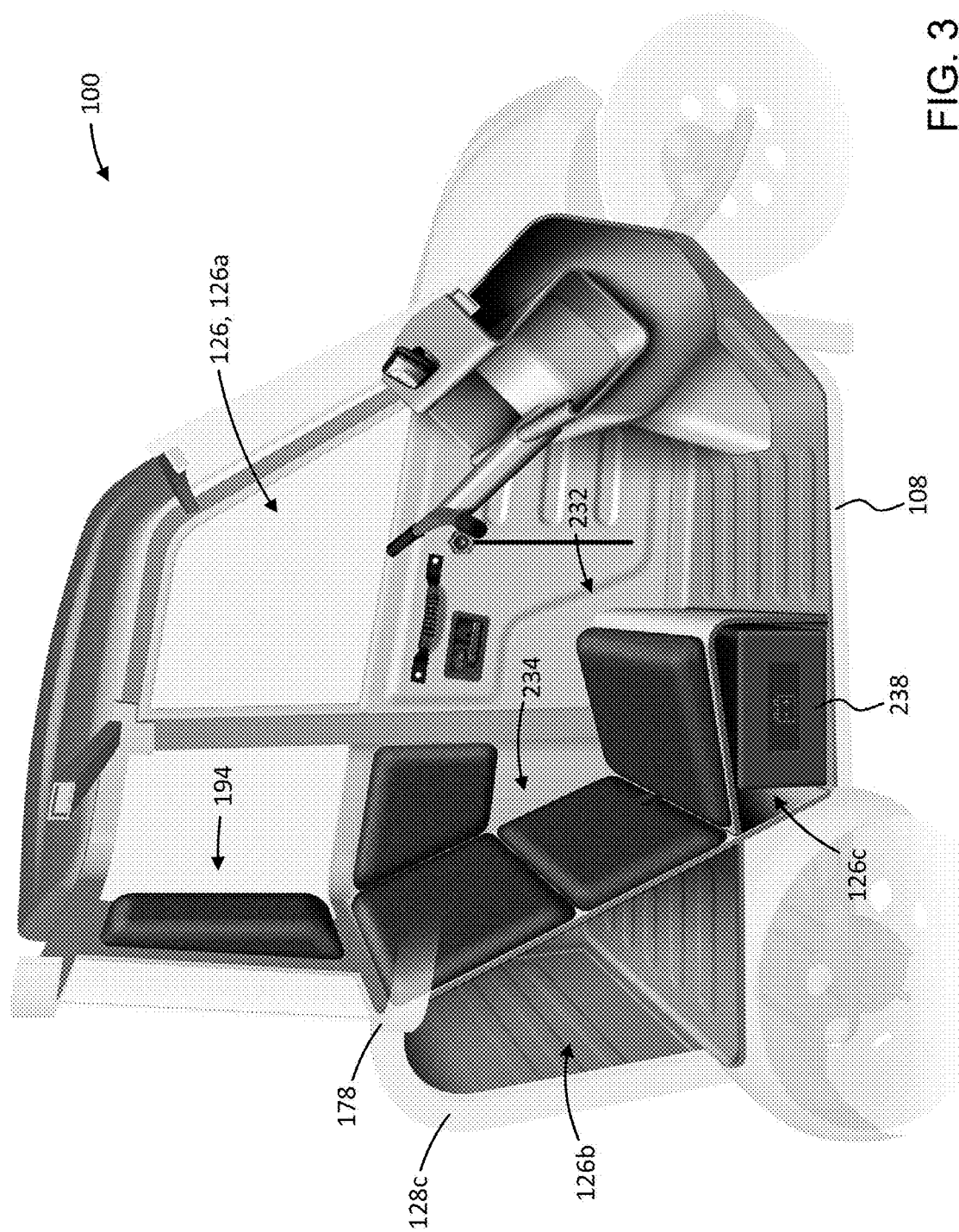
FIG. 3 is a partial cutaway side view showing interior compartments of the vehicle of FIG. 1.

Referring to FIG. 3, in the example illustrated, the vehicle 100 has a seat 232 in the interior 126 and a back rest 234 extending vertically between the seat 232 and the head rest 194. In the example illustrated, an upper end of the back rest 234 is supported by the lower U-shaped member 178. In the example illustrated, the back rest 234 separates the interior 126 into an occupant compartment 126a in front of the back rest 234 and a cargo compartment 126b behind the back rest 234. The interior 126 further includes a battery compartment 126c underneath the seat 232 for holding a battery pack 238 for powering the vehicle 100, including the electric motor 228. The seat 232 is liftable for accessing the battery compartment 236. In the example illustrated, the battery pack 238 is supported by the chassis floorpan 108.

Referring to FIG. 2, in the example illustrated, the vehicle 100 has a door 132 on each side of the chassis floorpan 108. Each door 132 is connected to a corresponding front pillar 128a through one or more hinges 240 for allowing the door to pivot between open and closed positions. When closed, each door 132 extends axially between corresponding front and intermediate pillars 128a, 128b, and vertically between a corresponding axial member 202 (of the roof structure) and the chassis floorpan 108.

Referring to FIG. 14, a flow chart illustrating an example process 500 for assembling components of the vehicle 100 is shown. At step 510 of the process 500, the tubular members of the frame are assembled together, forming the safety cage 122. The connections between respective tubular members can include rivets, glue, and/or welding.

Next, at step 520 of the process, the safety cage is aligned in position over the floorpan 108, with the lower ends of the pillars positioned against the outboard surface of the sidewall 142. Optionally, the lower ends of the pillars can be secured directly to the sidewall, by, for example, adhesive, mechanical fasteners, welds, etc. In some examples, during step 510, the generally flat bottom end 139 of each pillar 128 rests on a support surface (e.g. ground surface) for supporting the safety cage 122 in a free standing upright position, and the chassis floorpan 108 rests on the support surface inboard of the safety cage, with the sidewall 142 of the chassis floorpan 108 abutting each pillar 128 to help locate the chassis floorpan 108 relative to the pillars 128 during assembly.

At optional step 530 of the process 500, the plurality of pillars 128 of the safety cage 122 are secured to the floorpan 108 (and fixed against the sidewall 142) by the brackets 120. This includes, in the example illustrated, securing the brackets 120 to the chassis floorpan 108 adjacent the peripheral edge 118, with the overhang 146 of the bracket 120 projecting over and outboard of the sidewall 142, and the pillar received in the channel of the overhang. In the present example, step 530 includes fastening the brackets 120 to the chassis floorpan 108 with adhesive and fasteners (e.g. rivets). Furthermore, in the present example, step 530 includes fastening the pillars 128 to the brackets 120 with adhesive and fasteners (e.g. rivets).

The process 500 further includes mounting the wheel, drive, and interior components to the frame 106. The process 500 further includes, after step 530, mounting the body panels 130, doors 132, and windows 134 to the safety cage 122 to generally enclose the interior 126.

Referring to FIGS. 15 and 16, another example personal electric vehicle 1100 is illustrated. The vehicle 1100 has similarities to the vehicle 100, and like features are identified with like reference characters, incremented by 1000.

Figure 17:
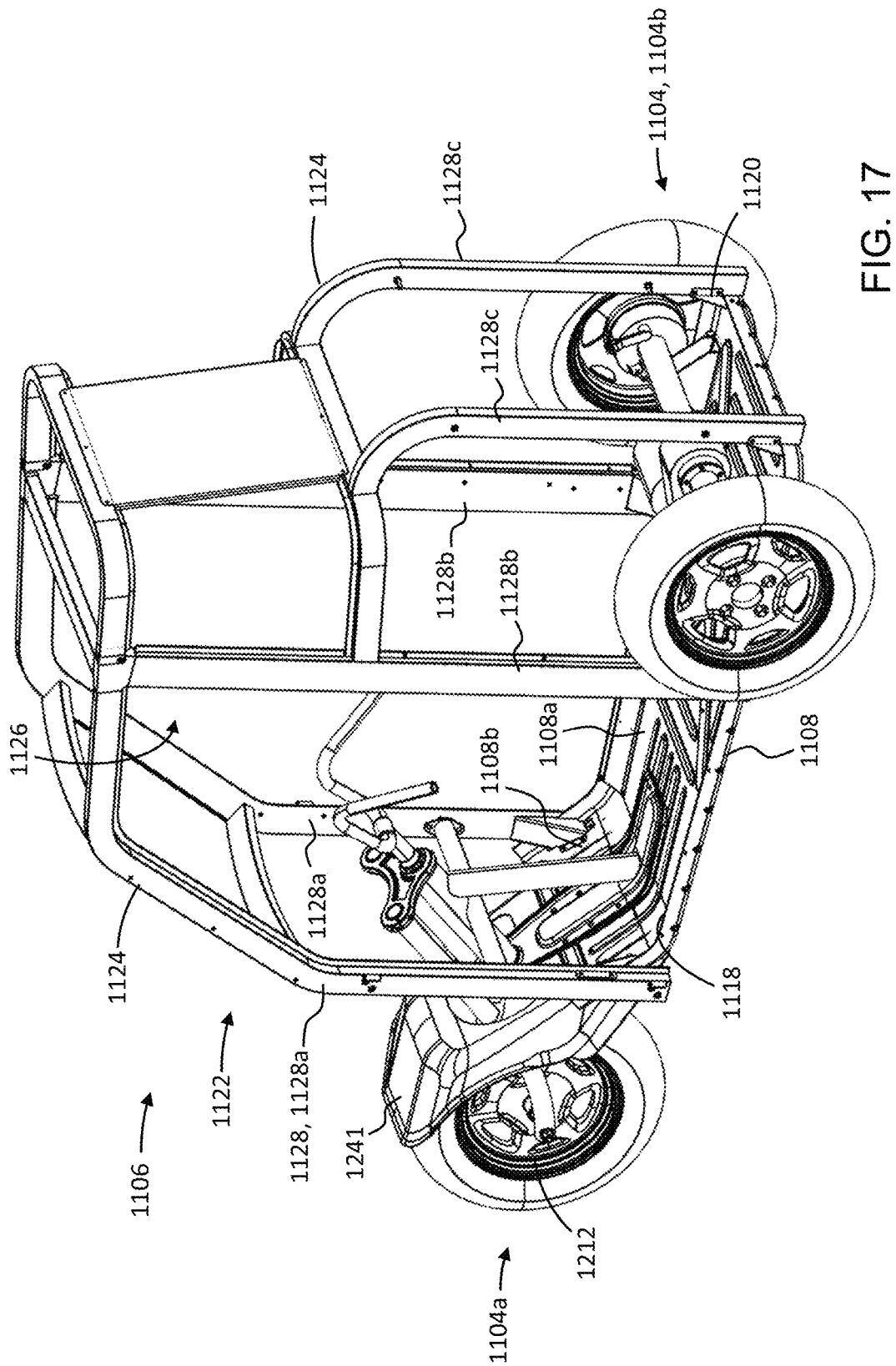
FIG. 17 is a rear perspective view from a first side of frame and wheel assemblies of the vehicle of FIG. 15.

In the example illustrated, the vehicle 1100 has a vehicle body 1102 and a plurality of wheel assemblies 1104 for supporting the vehicle body 1102 above a ground surface. Referring to FIG. 17, in the example illustrated, the vehicle body includes a frame 1106, and the frame 1106 includes a chassis floorpan 1108. The chassis floorpan 1108 has a peripheral edge 1118 extending thereabout. A plurality of brackets 1120 are fixed to and supported by the chassis floorpan 1108 adjacent the peripheral edge 1118, with the brackets 1120 spaced apart from each other along the peripheral edge 1118 (see also FIG. 20).

With reference again to FIG. 17, in the example illustrated, a safety cage 1122 is mounted to the chassis floorpan 1108. The safety cage 1122 includes a plurality of interconnected tubular members 1124 defining an interior 1126 for an occupant. The tubular members 1124 include a plurality of pillars 1128 fixed to the brackets 1120 for securing the safety cage 1122 to the chassis floorpan 1108. In the example illustrated, the pillars 1128 comprise a pair of front pillars 1128*a*, a pair of rear pillars 1128*c*, and a pair of intermediate pillars 1128*b* axially intermediate the front and rear pillars 1128*a*, 1128*c*.

Figure 18:
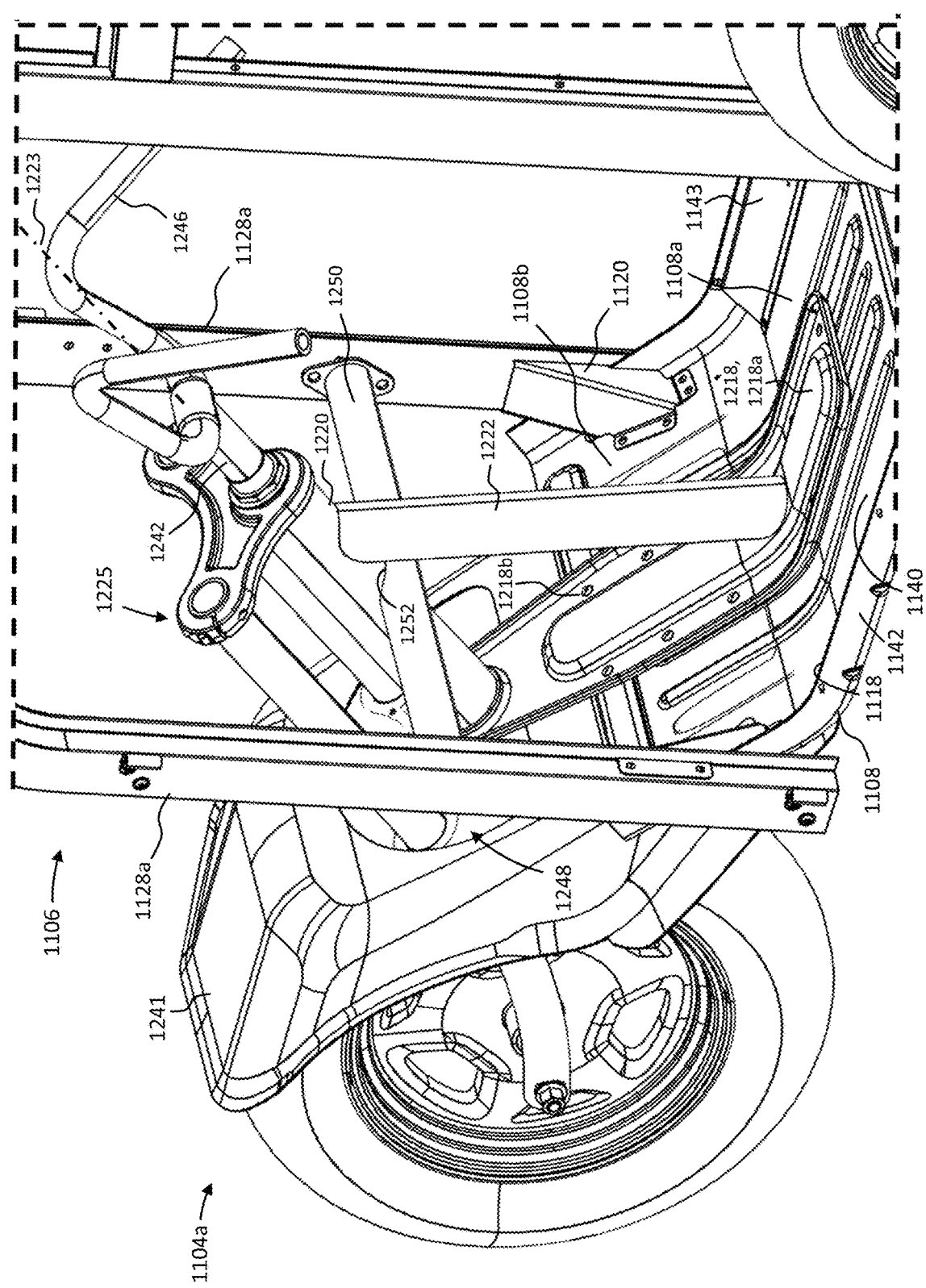
FIG. 18 is an enlarged rear perspective view from the first side of a portion of the frame and wheel assemblies of FIG. 17.
Figure 20:
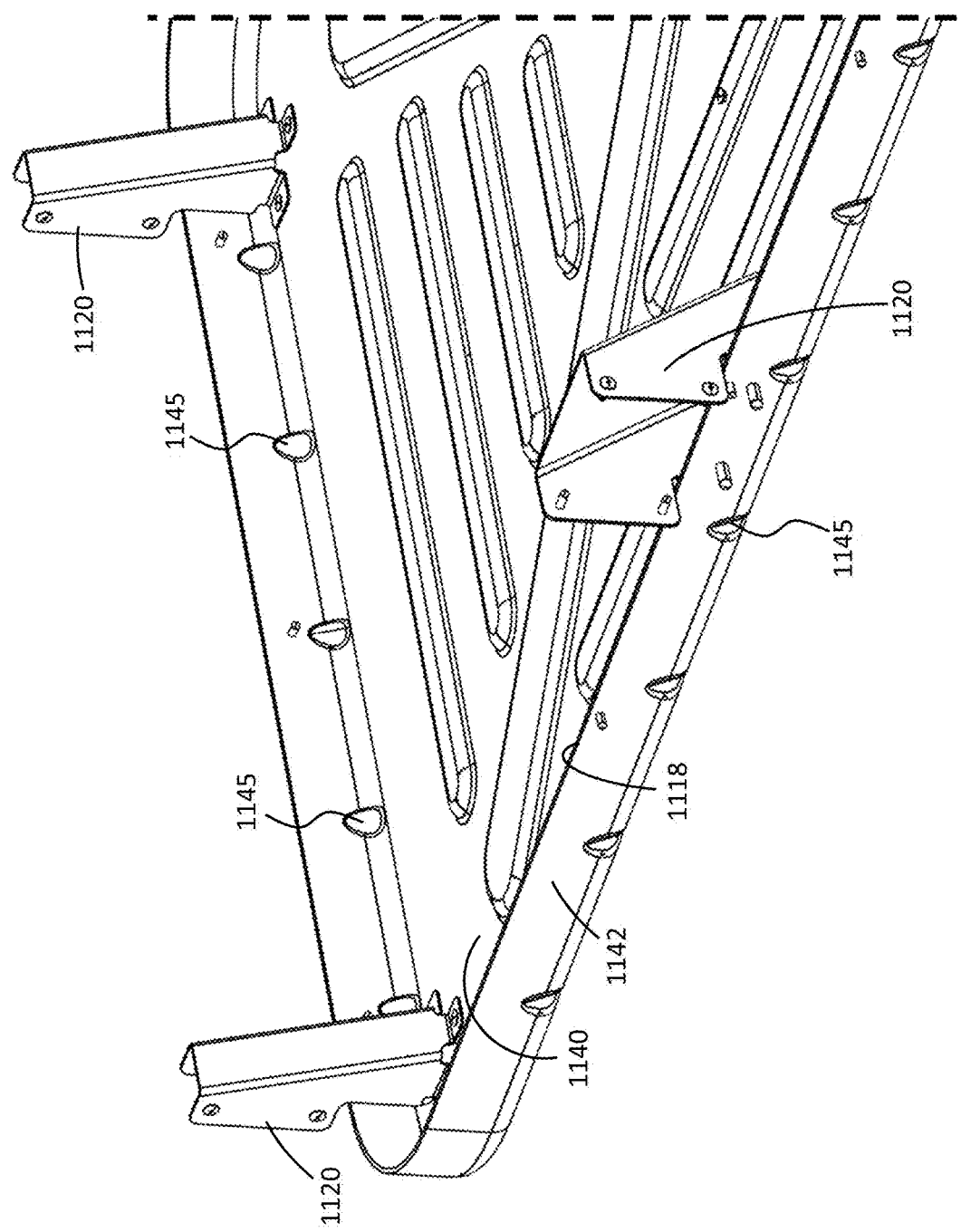
FIG. 20 is a perspective view from the second side of floorpan and bracket portions of the vehicle of FIG. 15.

Referring to FIG. 18, in the example illustrated, the chassis floorpan 1108 has a floor 1140 and a sidewall 1142 extending upwardly from a periphery of the floor 1140 to the peripheral edge 1118. In the example illustrated, a longitudinally intermediate portion of the sidewall 1142 along each of the left and right sides of the floorpan 1108 is reinforced by an edge gusset 1143 having a laterally outer edge connected to an inner surface of the sidewall 1142 proximate the upper end (i.e. proximate the peripheral edge 1118), and a laterally inner edge connected to the floor 1140 at a position spaced laterally inboard of the sidewall 1142. Referring to FIG. 20, in the example illustrated, the sidewall 1142 is further reinforced by a plurality of integral gussets 1145 spaced apart from each other along the peripheral edge 1118. Each integral gusset 1145 is, in the example illustrated, formed integrally with the chassis floorpan 1108 at the intersection between the floor 1140 and the sidewall 1142. Each integral gusset 1145 has an inclined surface extending upward and outward from the floorpan 1108 to the sidewall 1142.

Referring to FIG. 17, in the example illustrated, the wheel assemblies 1104 include a front wheel assembly 1104*a* (including a front wheel 1212) mounted toward the front of the chassis floorpan 1108 and a rear wheel assembly 1104*b* mounted toward the rear of the chassis floorpan 1108. In the example illustrated, the front wheel assembly 1104*a* is mounted to the frame 1106 laterally intermediate the front pillars 1128*a*.

In the example illustrated, the chassis floorpan 1108 has a generally horizontal floorpan portion 1108*a* extending from the rear toward the front of the floorpan 1108, and an inclined floorpan portion 1108*b* sloping upwardly from a front of the horizontal floorpan portion 1108*a* to the front of the chassis floorpan 1108. In the example illustrated, a front fender 1241 is mounted to the inclined floorpan portion 1108*b* of the floorpan (more particularly, in the example illustrated, to an underside surface of the inclined floorplan portion 1108*b*—see also FIG. 19), and extends forward and upward of the floorpan 1108 to provide a protective barrier behind, and the example illustrated, partially above, the front wheel 1212.

Referring to FIG. 18, in the example illustrated, the frame 1106 includes a front wheel assembly mount for steerably securing the front wheel 1212 to the frame 1106. In the example illustrated, the front wheel assembly mount includes a subplate 1218 fixed to the chassis floorpan 1108, for providing reinforced support for the front wheel assembly mount. The subplate 1218 has a generally horizontal subplate portion 1218*a* secured atop the horizontal floorpan portion 1108*a* of the floorpan 1108, and an inclined subplate portion 1218*b* extending from the front of the horizontal subplate portion 1218*a* secured atop the inclined floorpan portion 1108*b* of the floorpan 1108.

In the example illustrated, the front wheel assembly mount includes a steering tube 1220 projecting generally orthogonally from an upper surface of the inclined subplate portion 1218*b* along a steering axis 1223. A lower end of the steering tube is fixed to a forward end of the inclined subplate portion 1218*b* of the subplate. An upper end portion of the steering tube 1220 is fixed to an upper end of a support post 1222. In the example illustrated, the support post 1222 has a lower end fixed to the horizontal subplate portion 1218*a* of the subplate 1218. The support post 1222 helps brace the steering tube 1220 to hold the steering tube 1220 in fixed position relative to the frame 106 during use of the vehicle.

In the example illustrated, the wheel assembly mount further includes a support cross-member 1250 that can further help secure the steering tube 1220 in fixed position relative to the frame 1106, and help reinforce and increase rigidity of the frame 1106. The cross-member 1250 extends, in the example illustrated, laterally between, and has opposed ends secured to, the spaced apart front pillars 1128*a*. In the example illustrated, the cross-member 1250 comprises a tube having a circular cross section The cross-member 1250 is, in the example illustrated, positioned vertically beneath the steering tube 1220 and longitudinally forward of the upright support post 1222, proximate the location where the tube 1220 and post 1222 are secured together. In the example illustrated, the cross-member 1250 and steering tube 1220 are secured together by an adhesive. The cross-member 1250 has, in the example illustrated, an optional cutout defining a seat 1252 receiving an underside portion of the steering tube 1220, to facilitate securing together the cross-member 1250 and steering tube 1220.

Figure 19:
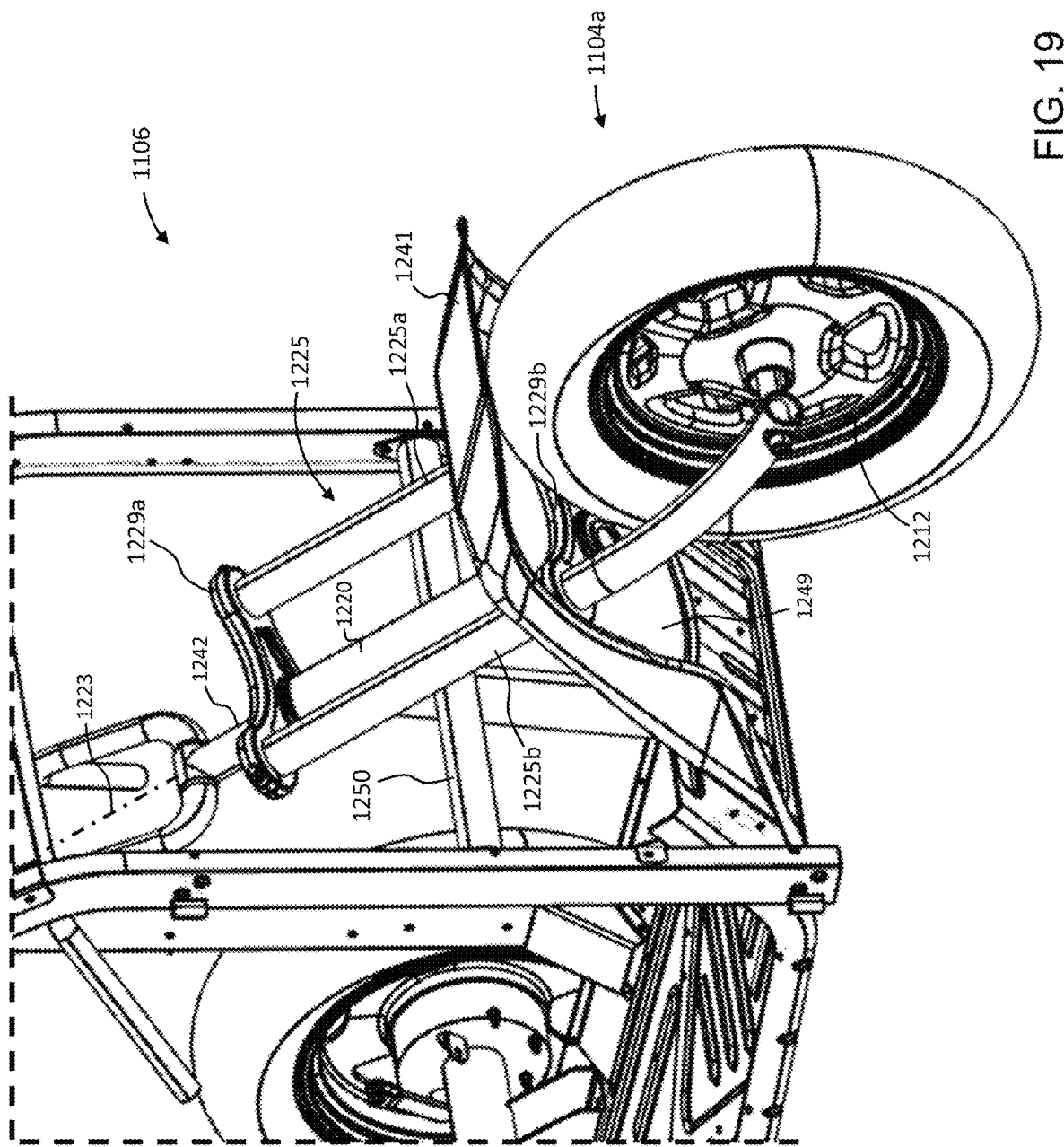
FIG. 19 is an enlarged front perspective view from a second side of a portion of the frame and wheel assemblies of FIG. 17.

Referring to FIG. 19, in the example illustrated, the front wheel assembly 1104*a* includes a steering fork assembly 1225 for pivotably coupling the front wheel 1212 to the steering tube 1220. In the example illustrated, the steering fork assembly 1225 includes a left fork 1225*a* having a lower end secured to a left end of an axle passing through a central axis of the front wheel 1212, and a right fork 1225*b* having a lower end secured to a right end of the axle. The left and right forks 1225*a*, 1225*b* are held in spaced-apart relation from each other by at least one yoke extending laterally between the forks. The at least one yoke is rotatably secured to the steering tube for pivoting of the yoke (along with the forks and front wheel) about the steering axis 1223.

In the example illustrated, the fork assembly 1225 is in the form of a "triple tree" configuration. The at least one yoke comprises an upper yoke 1229*a* rotatably mounted to the upper end of the steering tube 1220, and a lower yoke 1229*b* rotatably mounted to a lower end of the steering tube 1220. Each yoke has a generally plate-like yoke body, with a central boss mounted to a respective end of the steering tube 1220. Each yoke further has, in the example illustrated, a left arm extending forward and laterally leftward of the central bore, and a right arm extending forward and laterally rightward of the central bore, and a web extending between at least a portion of the arms. Each arm has a fork bore for receiving and securing a respective fork to the yoke.

In the example illustrated, the fork assembly 1225 further comprises a steering shaft 1242 extending through, and rotatable within, the steering tube 1220. A lower portion of the steering shaft 1242 is fixed to the lower yoke at the central boss of the lower yoke. An upper portion of the steering shaft 1242 is fixed to the upper yoke at the central boss of the upper yoke. Rotation of the steering shaft 1242 about the steering axis 1223 effects a pivoting motion (e.g. clockwise and counter-clockwise) of the upper and lower yokes about the steering axis, and hence, a corresponding turning (rightward and leftward) of the front wheel 1212.

Referring to FIG. 18, in the example illustrated, the steering fork assembly 1225 further comprises a steering handgrip, for example, steering handlebars 1246, fixed to an upper end of the steering shaft 1242 extending upward from the upper yoke. The handlebars 1246 are operable by a user for pivoting the front wheel assembly 1104a about the steering axis 1223 to steer the vehicle 1100.

Still referring to FIG. 18, in the example illustrated, the steering fork assembly 1225 extends through a fender opening 1248 in the front fender 1241. Referring to FIG. 19, a cover plate 1249 is mounted to the steering fork assembly 1225 below the front fender 1241 for covering the fender opening 1248 when the front wheel assembly 1104a is pivoted about the steering axis 1223. In the example illustrated, the lower yoke 1229b is below the cover plate 1249.

In the example illustrated, the cross member 1250 is spaced rearward of the fork assembly 1225 and serves as a stop for engagement with forks 1225a, 1225b (FIG. 19) to limit pivoting of the fork assembly 1225 about the steering axis 1223. Pivoting of the fork assembly 1225 in a counter-clockwise direction is limited by engagement of the left fork 1225a with the cross-member 1250. Pivoting of the fork assembly 1225 in a clock-wise direction is limited by engagement of the right fork 1225b with the cross-member 1250. Limiting the extent by which the fork assembly 1225 can pivot about the steering axis 1223 can help prevent oversteering of the front wheel assembly 1104a, which could otherwise cause potential harm, for example, due to loss of control or tipping of the vehicle.

Figure 21:
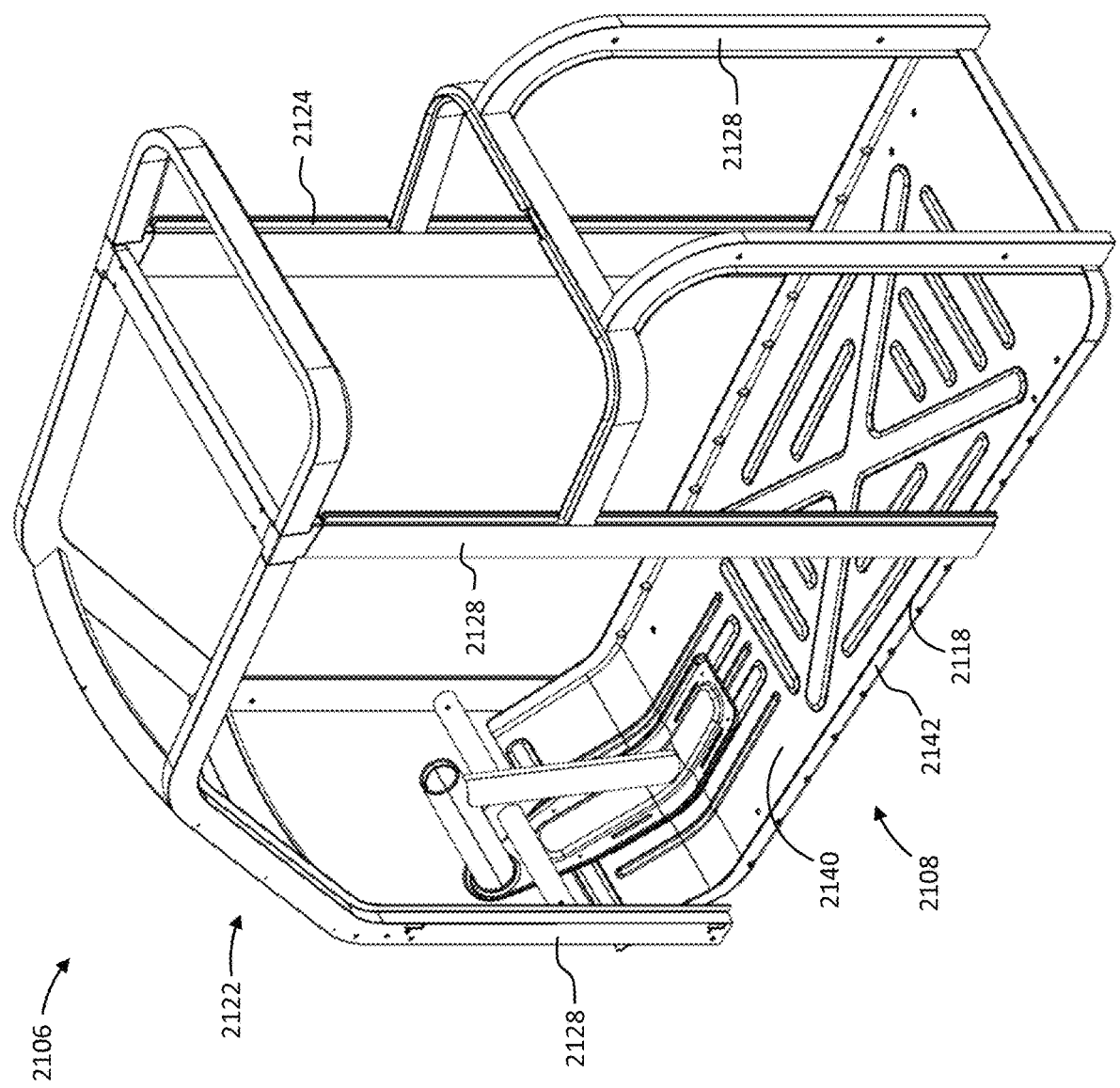
FIG. 21 is a rear perspective view of a frame assembly for another example personal electric vehicle.

Referring to FIG. 21, another example frame 2106 for a personal electric vehicle (like the vehicles 100, 1100) is illustrated. The frame 2106 has similarities to the frame 1106, and like features are identified with like reference characters, incremented by 1000.

In the example illustrated, the frame 2106 includes a chassis floorpan 2108. The floorpan 2108 has a floor 2140 and a sidewall 2142 extending upwardly from a periphery of the floor 2140 to a raised peripheral edge 2118 of the floorpan 2108. A safety cage 2122 is mounted to the chassis floorpan 2108. The safety cage 2122 includes a plurality of interconnected tubular members 2124 defining an occupant interior. The tubular members 2124 include a plurality of pillars 2128 spaced apart from each other along the peripheral edge 2118 and fixed against the sidewall 2142 for securing the safety cage 2122 to the chassis floorpan 2108.

Figure 22:
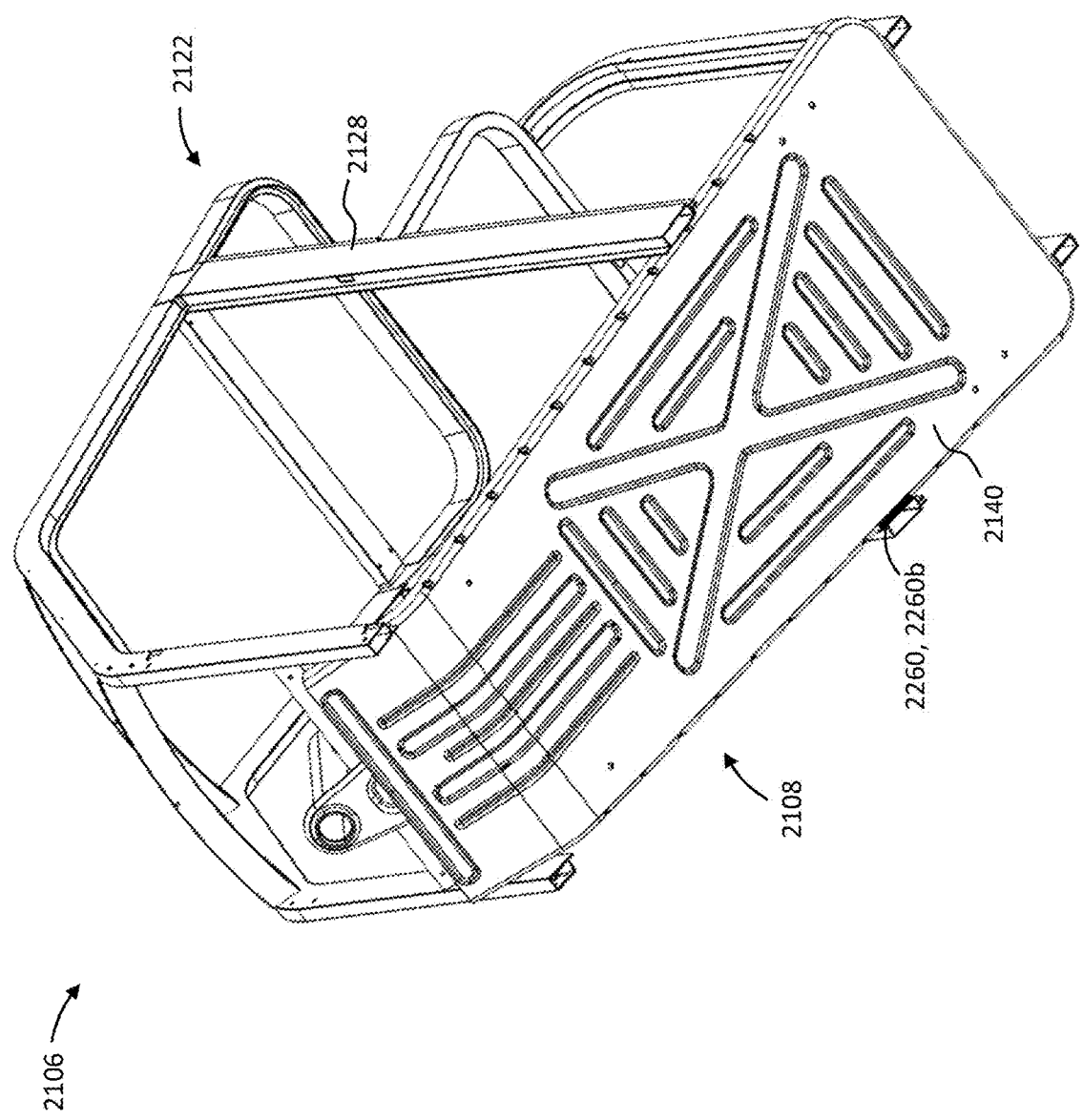
FIG. 22 is a perspective view from an underside of the frame assembly of FIG. 21.
Figure 23:
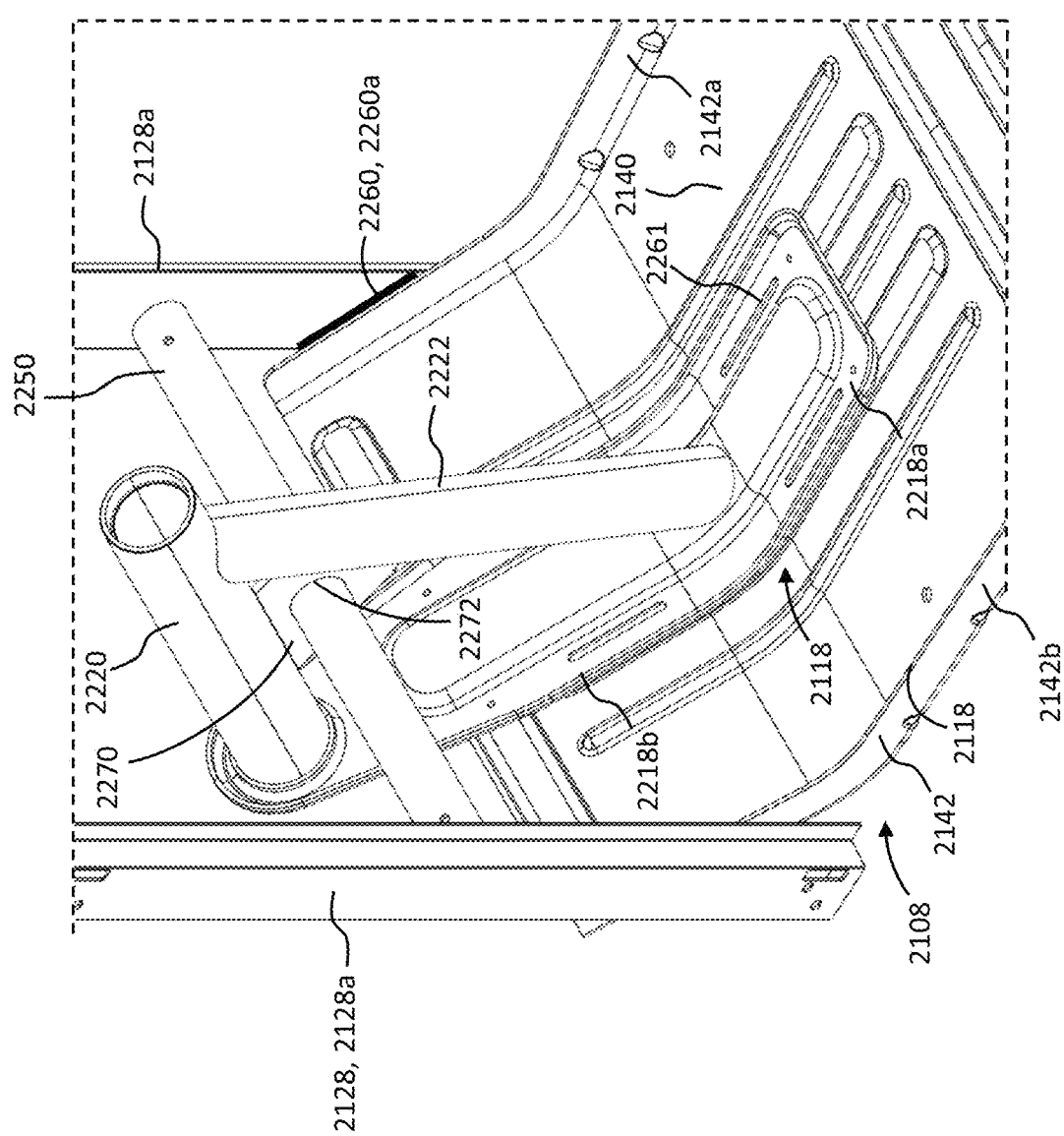
FIG. 23 is an enlarged view of a portion of the frame assembly of FIG. 21.

Referring to FIG. 23, in the example illustrated, the pillars 2128 are outboard of the sidewall 2142 (and the floorpan 2108). In the example illustrated, the sidewall 2142 has an inboard surface 2142a directed inwardly toward the floor 2140 and an outboard surface 2142b opposite the inboard surface 2142a and directed away from the floor 2140 of the floorpan 2108. In the example illustrated, the pillars are fixed against the outboard surface 2142b. In the example illustrated, the pillars are welded to the sidewall 2142. In the example illustrated, each pillar 2128 is secured directly to the sidewall 2142 through a plurality of welds 2260 (one of which is shown schematically in FIG. 23) between the pillar 2128 and the outboard surface 2142b of the sidewall 2142. In the example illustrated, the plurality of welds 2260 include an upper weld 2260a extending along the sidewall 2142 adjacent the peripheral edge 2118, and a lower weld 2260b (one of which is shown schematically in FIG. 22) extending along the sidewall 2142 adjacent a lower end of the sidewall 2142 vertically opposite the peripheral edge 2118.

Referring to FIG. 23, in the example illustrated, the frame 2106 includes a front wheel assembly mount for steerably securing a front wheel to the frame 2106. In the example illustrated, the front wheel assembly mount includes a subplate 2218 fixed to the chassis floorpan 2108. In the example illustrated, the subplate 2218 is welded to the chassis floorpan 2108. The subplate 2218 has a generally horizontal subplate portion 2218a and an inclined subplate portion 2218b extending from the front of the horizontal subplate portion 2218a. In the example illustrated, each of the subplate portions 2218a, 2218b has a plurality of openings (in the form of slots 2261) extending therethrough and open to an upper surface of the floor 2140 of the floorpan 2108 for receiving welds to fix the subplate portions 2218a, 2218b to the floorpan 2108.

In the example illustrated, the front wheel assembly mount includes a steering tube 2220 projecting generally orthogonally from an upper surface of the inclined subplate portion 2218b along a steering axis. A lower end of the steering tube 2220 is fixed to a forward end of the inclined subplate portion 2218b. An upper end portion of the steering tube 2220 is fixed to an upper end of a support post 2222. In the example illustrated, the support post 2222 has a lower end fixed to the horizontal subplate portion 2218a. In the example illustrated, the wheel assembly mount includes a support cross-member 2250 that can further help secure the steering tube 2220 in fixed position relative to the frame 2106, help reinforce and increase rigidity of the frame 2106, and act as a stop for engagement with forks of a steering fork assembly to help prevent oversteer. The cross-member 2250 extends, in the example illustrated, laterally between, and has opposed ends secured to, spaced apart front pillars 2128a of the plurality of pillars 2128. In the example illustrated, the front wheel assembly mount includes a reinforcement plate 2270 oriented generally vertically and joining the tube 2220 and post 2222 proximate and at an elevation below the location where the tube 2220 and post 2222 intersect. In the example illustrated, the reinforcement plate 2270 has an aperture 2272 extending laterally through the plate 2270 generally concentric with the cross-member 2250. The cross-member 2250 passes through the aperture 2272 to help further reinforce the front wheel assembly mount.

The invention claimed is:

1. A frame for a personal electric vehicle, comprising:
  a) a chassis floorpan extending axially between a front and a rear and laterally between opposite sides, the floorpan having a floor and a sidewall extending upwardly from a periphery of the floor to a raised peripheral edge of the floorpan; and
  b) a safety cage mounted to the chassis floorpan and comprising a plurality of interconnected tubular members defining an occupant interior, the tubular members including a plurality of pillars spaced apart from each other along the peripheral edge and fixed against the sidewall for securing the safety cage to the chassis floorpan.

2. The frame of claim 1, wherein the sidewall has an inboard surface directed inwardly toward the floor of the floorpan and an outboard surface opposite the inboard surface and directed away from the floor of the floorpan, and wherein the pillars are fixed against the outboard surface of the sidewall.

3. The frame of claim 2, wherein the pillars are welded to the outboard surface of the sidewall.

4. The frame of claim 1, wherein the sidewall is reinforced by a plurality of integral gussets spaced apart from each other along the peripheral edge, each gusset formed integrally with the chassis floorpan at the intersection between the floor and the sidewall.

5. The frame of claim 4, wherein each gusset has an inclined surface extending upward and outward from the floorpan to the sidewall.

6. The frame of claim 1, wherein the sidewall extends generally continuously along the opposite sides and rear of the chassis floorpan, and wherein the pillars include at least a first pair of pillars fixed against the sidewall on laterally opposite sides of the chassis floorpan and a second pair of pillars fixed against the sidewall at the rear of the floorpan for protecting the vehicle from rear impact.

7. The frame of claim 1, wherein an entire weight of the safety cage is borne by the chassis floorpan.

8. The frame of claim 1, wherein the chassis floorpan is formed of integral, unitary, one-piece stamped metal construction.

9. The frame of claim 1, wherein the chassis floorpan and the tubular members are formed of aluminum.

10. The frame of claim 1, wherein the pillars include a pair of front pillars adjacent the front and on laterally opposite sides of the chassis floorpan, a pair of rear pillars at the rear of and adjacent laterally opposite sides of the chassis floorpan for protecting the vehicle from rear impact, and a pair of intermediate pillars axially intermediate the front and rear pillars and on laterally opposite sides of the chassis floorpan.

11. The frame of claim 10, wherein each rear pillar has a vertical extent of at least 0.75 m.

12. The frame of claim 10, wherein the tubular members include a U-shaped member connecting the rear pillars to the intermediate pillars to facilitate force transfer from the rear pillars to the intermediate pillars during rear impact, the U-shaped member having a cross member extending laterally between and connecting upper ends of the pair of rear pillars, and a pair of axial members extending from laterally opposite ends of the cross member to the pair of intermediate pillars.

13. The frame of claim 12, wherein the upper ends of the rear pillars and the U-shaped member are at an elevation below upper ends of the intermediate pillars.

14. The frame of claim 1, wherein the chassis floorpan has a generally horizontal floorpan portion and an inclined floorpan portion sloping upwardly from a front of the horizontal floorpan portion to the front of the chassis floorpan, and wherein at least one pair of the pillars are fixed to the inclined floorpan portion on corresponding sides of the floorpan.

15. The frame of claim 14, further comprising a reinforcing subplate secured to a portion of the chassis floorpan, the subplate having a generally horizontal subplate portion fixed to an upper surface of the horizontal floorpan portion and an inclined subplate portion extending forward from a front end of the horizontal subplate portion, the inclined subplate portion fixed to an upper surface of the inclined floorpan portion, the frame further comprising a steering tube projecting generally orthogonally from an upper surface of the inclined subplate portion, the steering tube for coupling a steerable front wheel to the frame.

16. The frame of claim 15, further comprising a support post extending between an upper end of the steering tube and the horizontal subplate portion for supporting the steering tube in fixed position relative to the floorpan.

17. The frame of claim 15, wherein the inclined subplate portion has an extension projecting forward of the chassis floorpan, and a bottom portion of the steering tube is fixed to the extension.

18. The frame of claim 1, further comprising a plurality of brackets fixed to and supported by the floorpan adjacent the peripheral edge and spaced apart from each other therealong, and wherein each pillar has a generally vertical lower portion outboard of the peripheral edge of the floorpan and fixed to a corresponding bracket.

19. The frame of claim 18, wherein each bracket has a base fixed to the chassis floorpan inboard of the sidewall and an overhang projecting over and outboard of the sidewall, the overhang fixed to the lower portion of a corresponding pillar.

20. The frame of claim 19, wherein the overhang defines a vertical channel outboard of the sidewall for receiving the lower portion of a corresponding pillar.

* * * * *